Feb. 26, 1963  N. D. PRESTON  3,079,494
AUTOMATIC CTC SYSTEM
Filed March 12, 1959  19 Sheets-Sheet 1
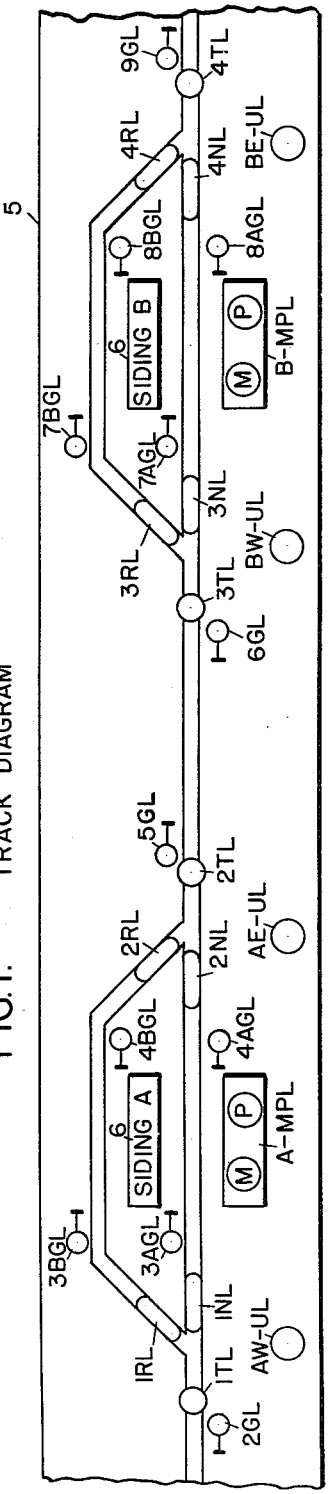
FIG.1. TRACK DIAGRAM
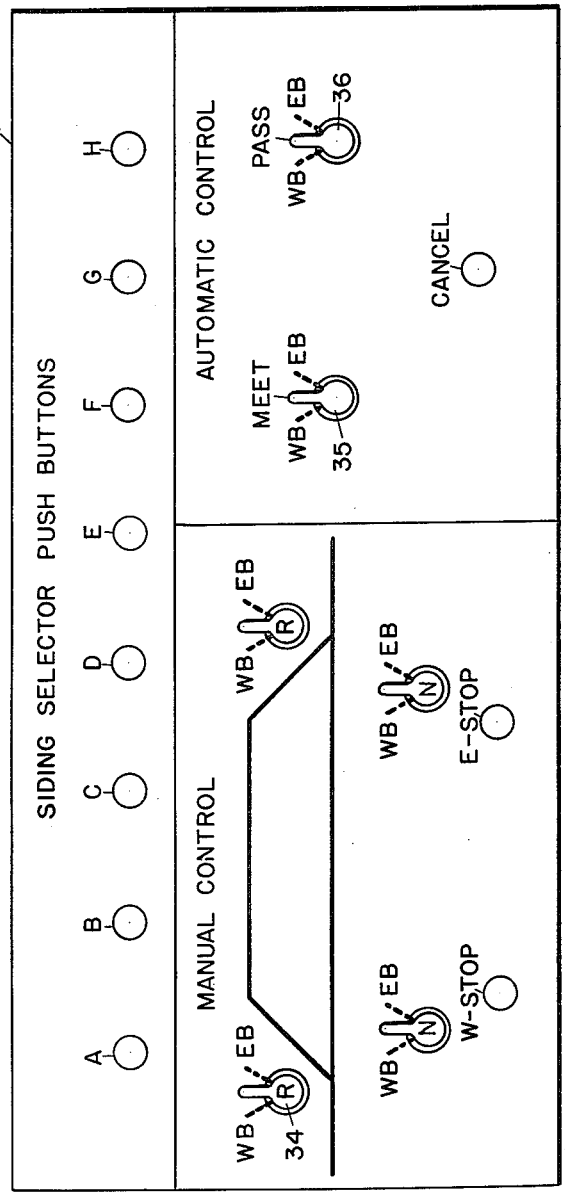
FIG.2. MASTER CONTROL PANEL
INVENTOR.
N. D. PRESTON
BY
HIS ATTORNEY

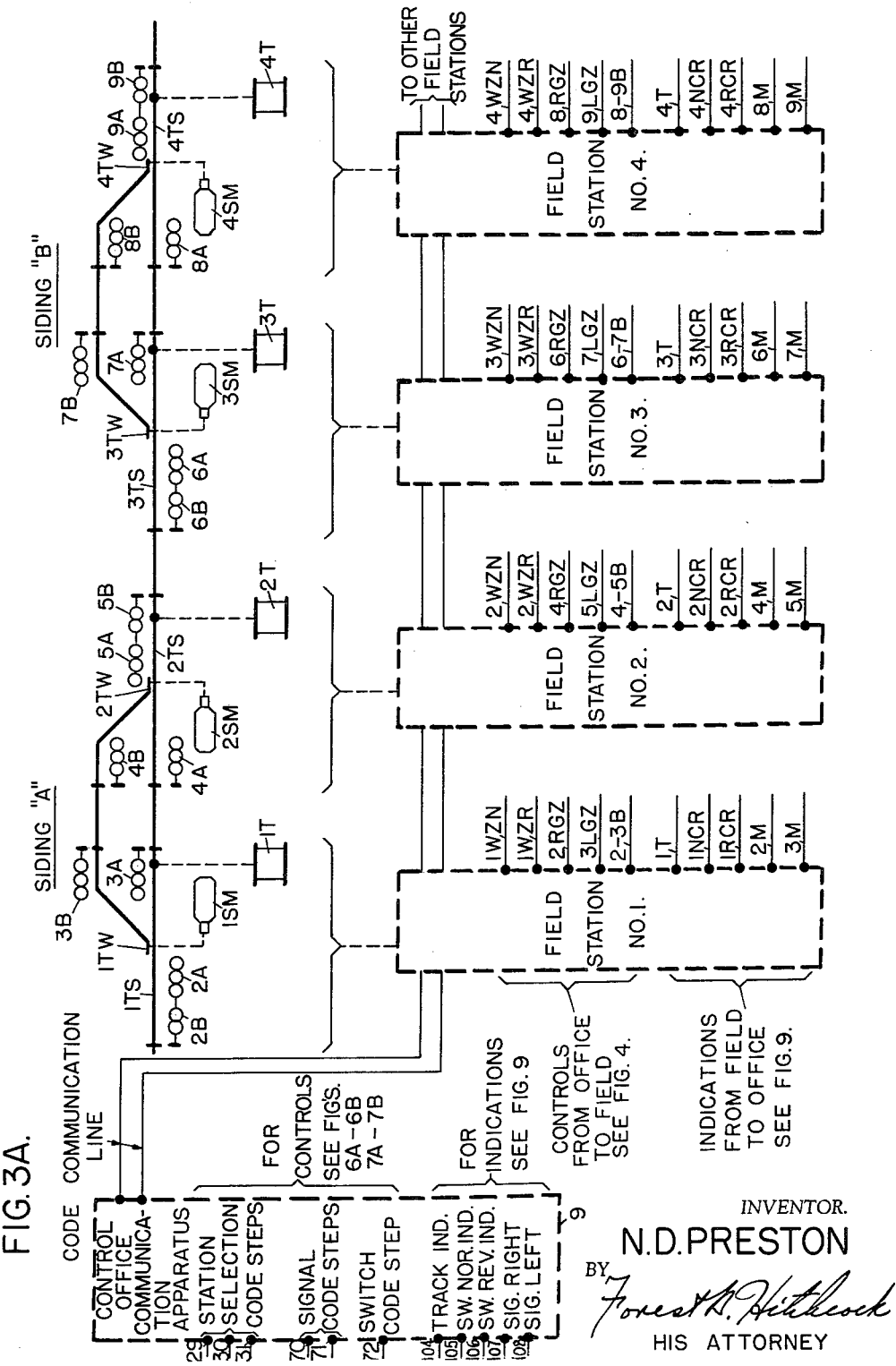

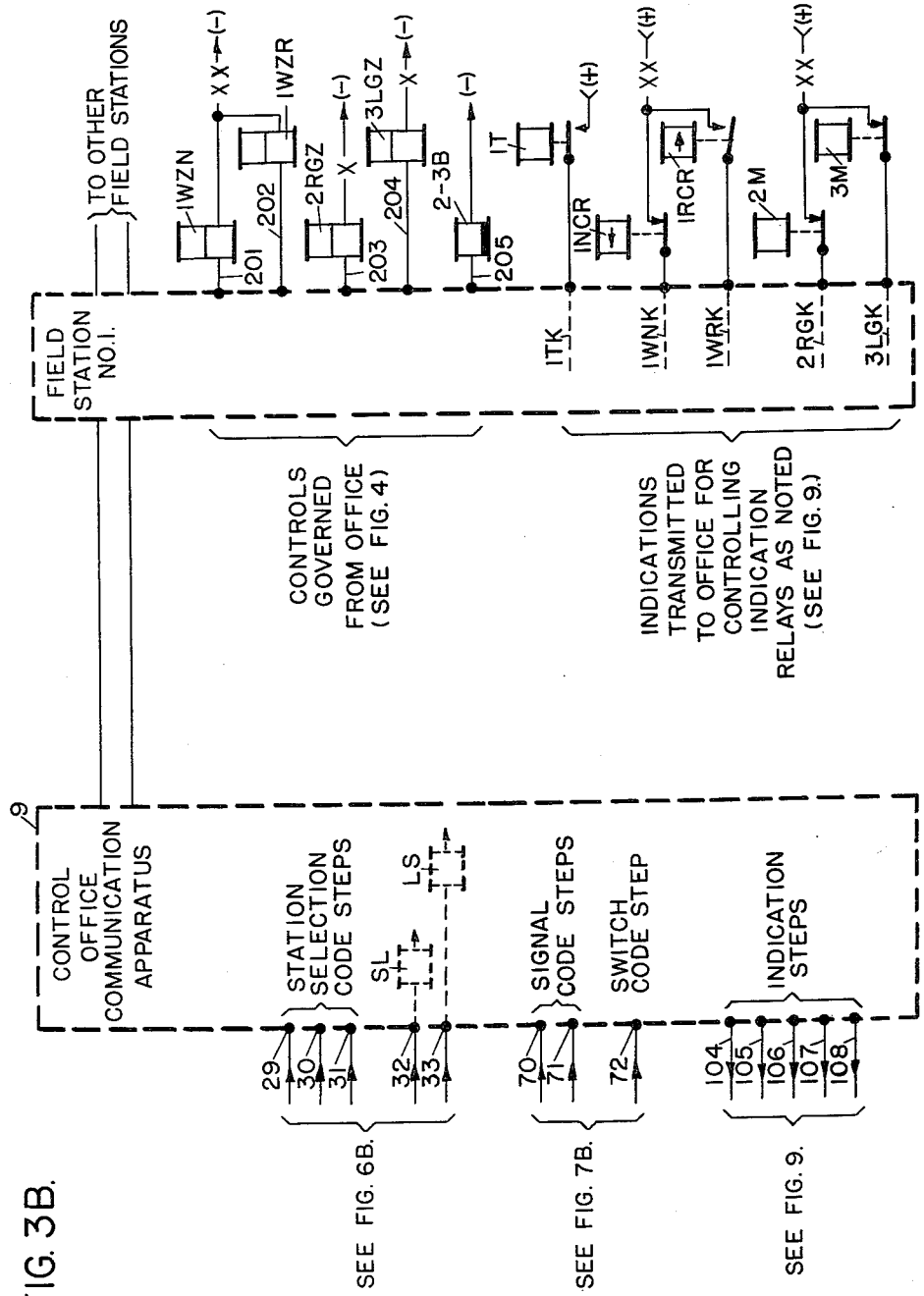

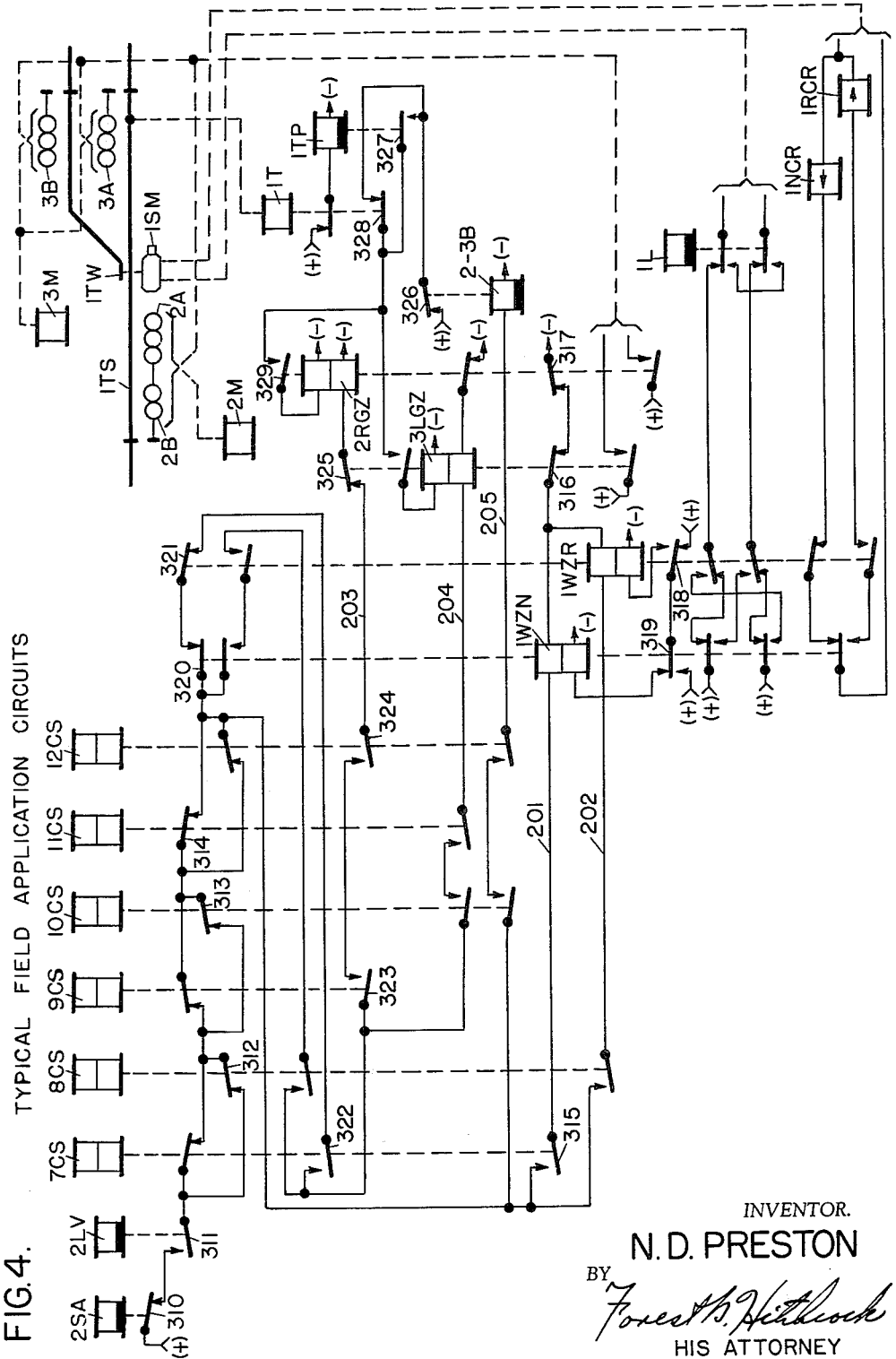

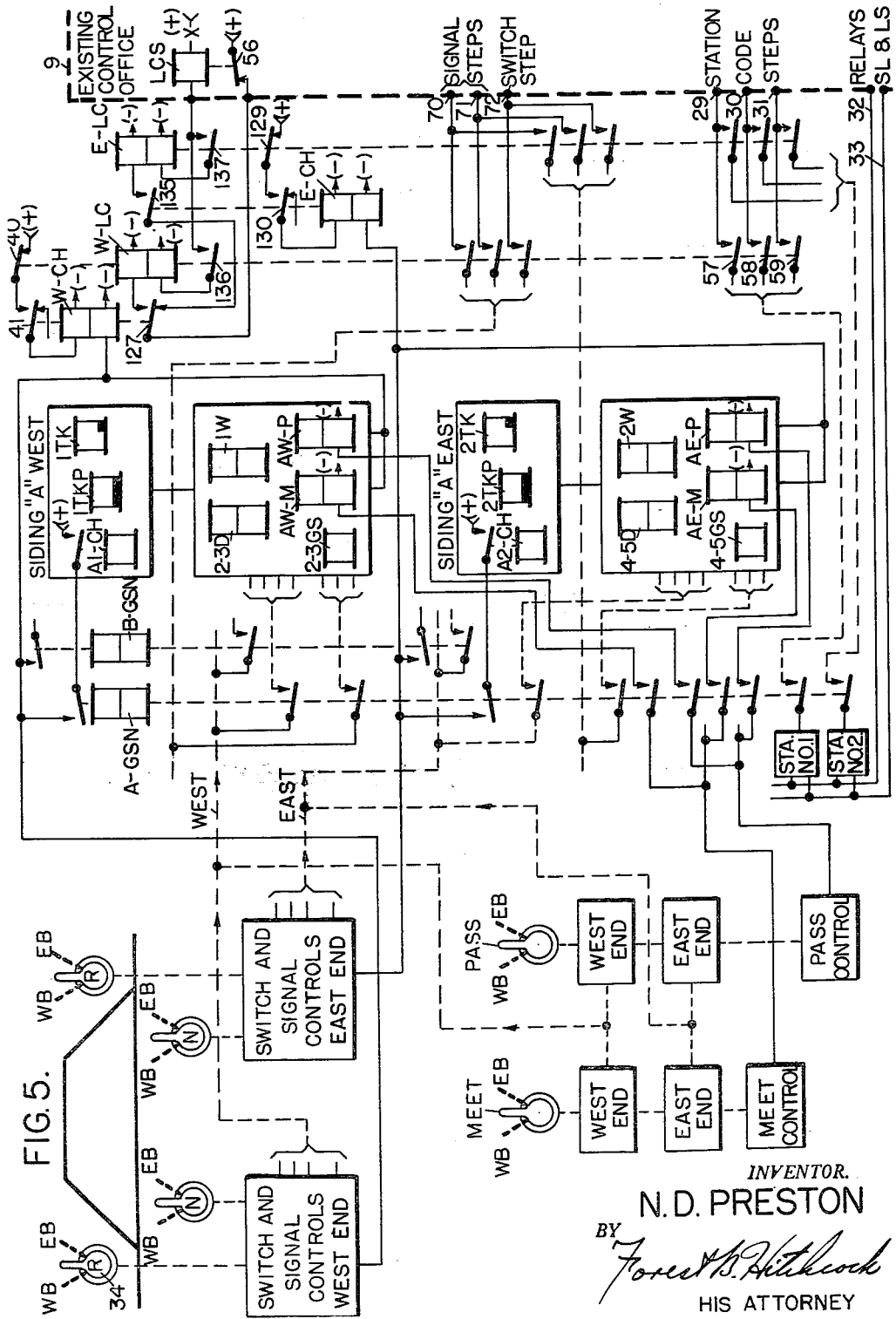

FIG. 6A. SIDING SELECTION-AUTOMATIC START CIRCUITS
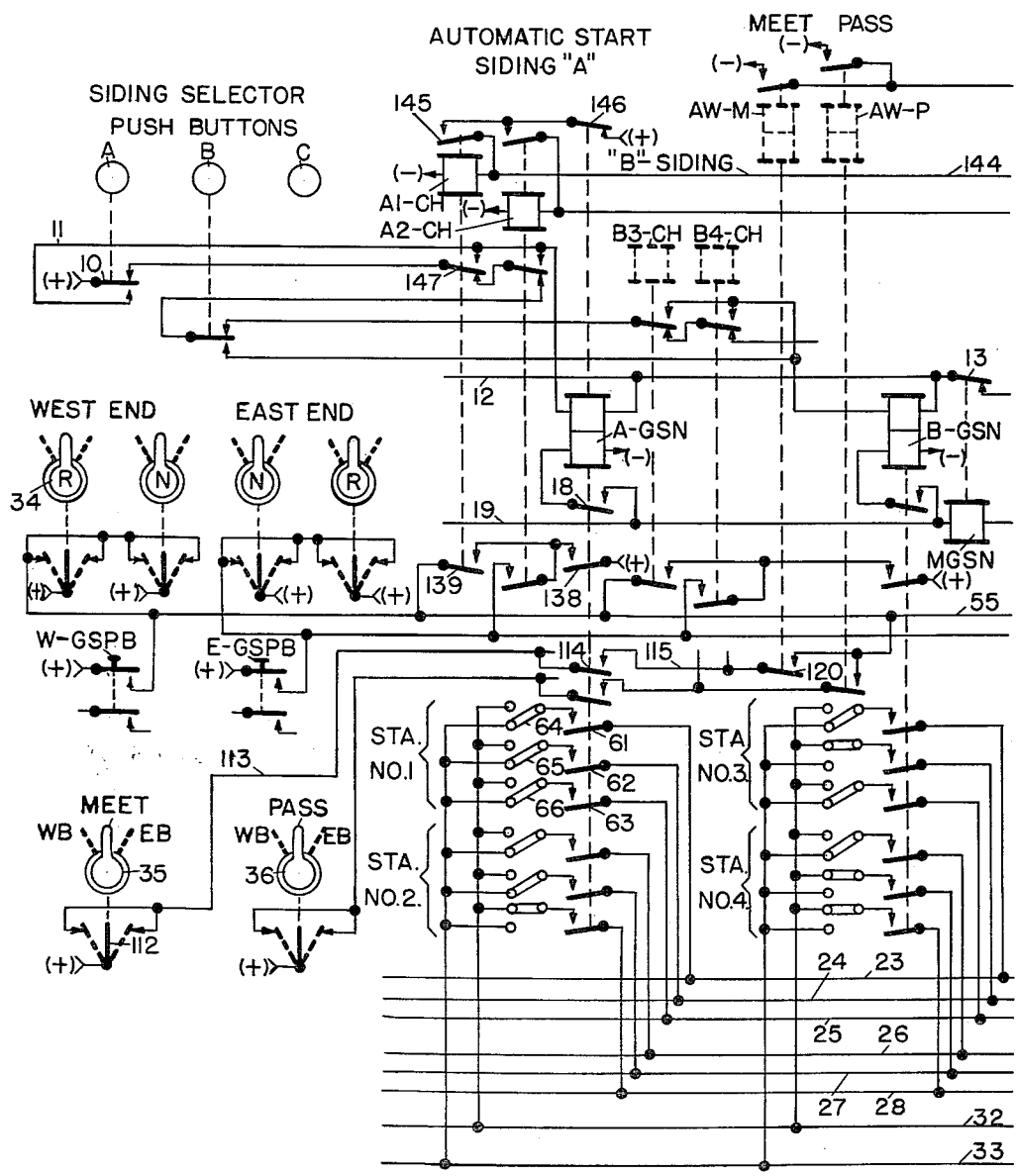
INVENTOR.
N.D. PRESTON
BY
Forest B. Hitchcock
HIS ATTORNEY Feb. 26, 1963  N. D. PRESTON  3,079,494
AUTOMATIC CTC SYSTEM
Filed March 12, 1959  19 Sheets-Sheet 7

INVENTOR.
N. D. PRESTON
BY
HIS ATTORNEY

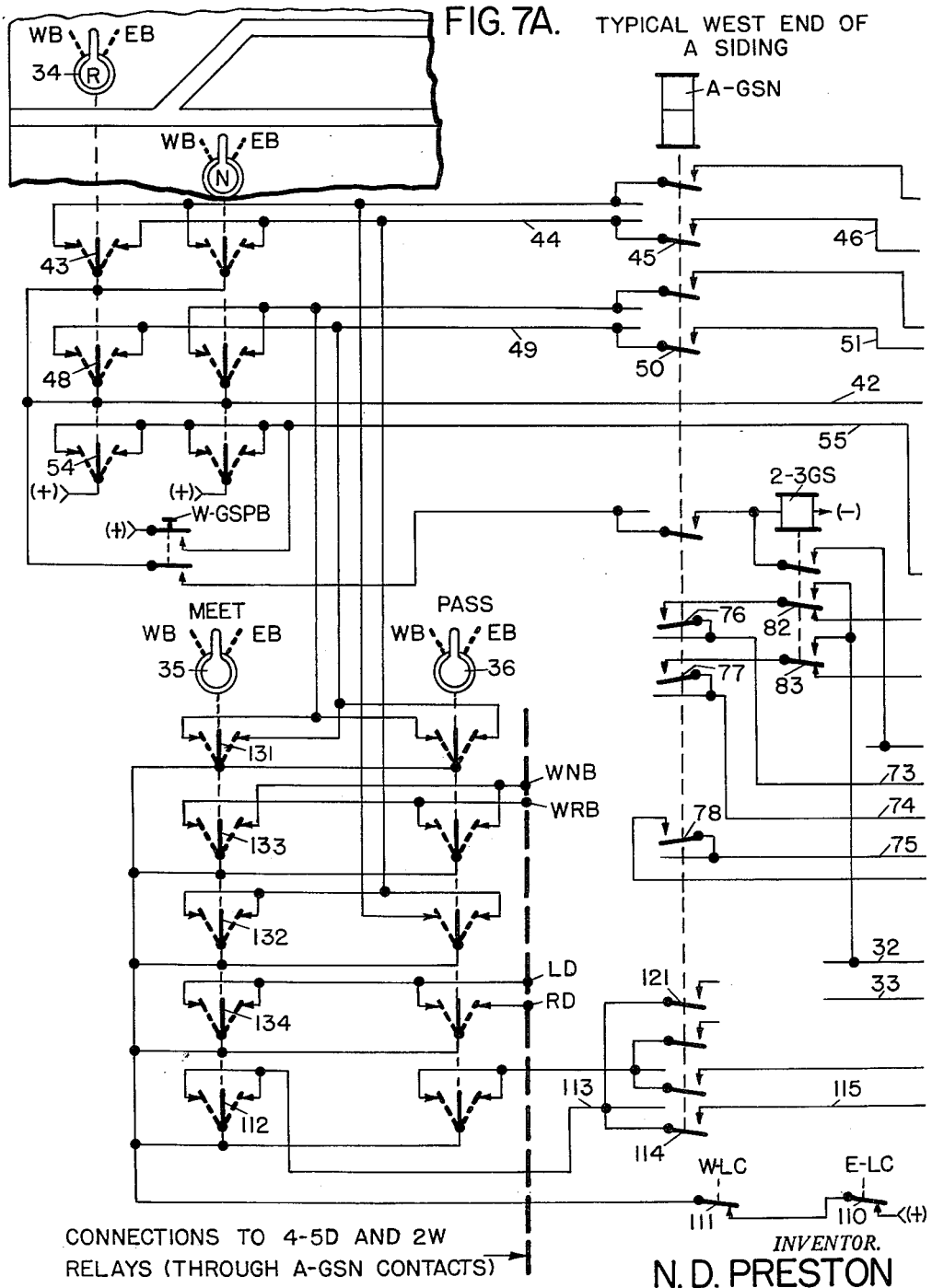

Feb. 26, 1963

N. D. PRESTON 3,079,494

AUTOMATIC CTC SYSTEM

Filed March 12, 1959

INVENTOR.
N. D. PRESTON
BY
HIS ATTORNEY

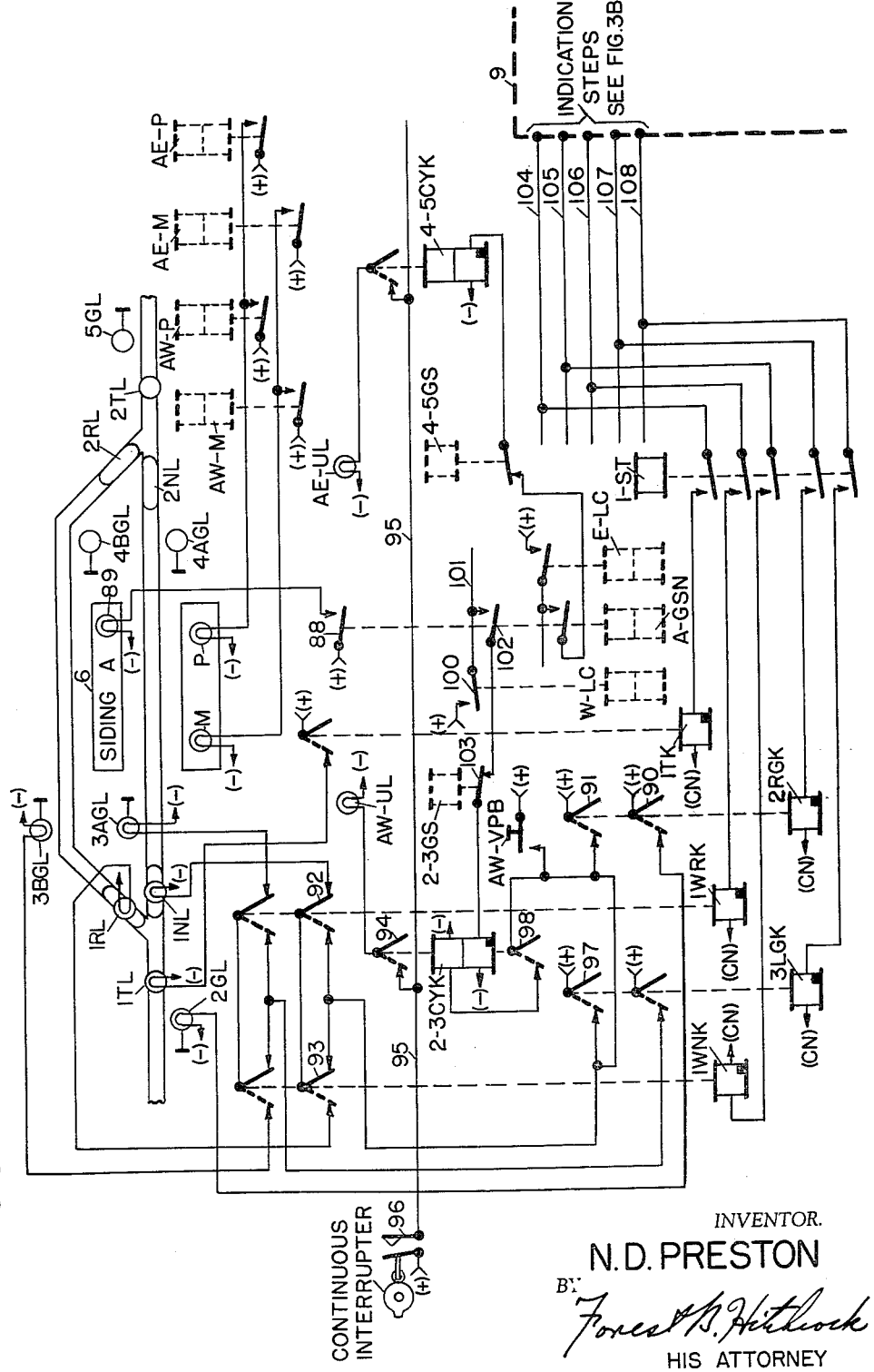
FIG. 9. TYPICAL INDICATION DISPLAY-ONE SIDING
INVENTOR.
N.D. PRESTON

Feb. 26, 1963    N. D. PRESTON    3,079,494
AUTOMATIC CTC SYSTEM
Filed March 12, 1959    19 Sheets-Sheet 12

FIG. IOA.    MEET SEQUENCE
EASTBOUND TRAIN TAKES SIDING

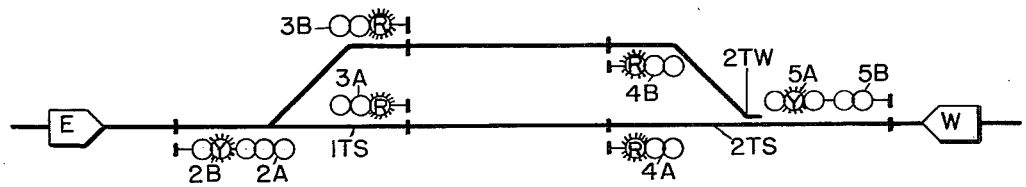

FIG. IOB.

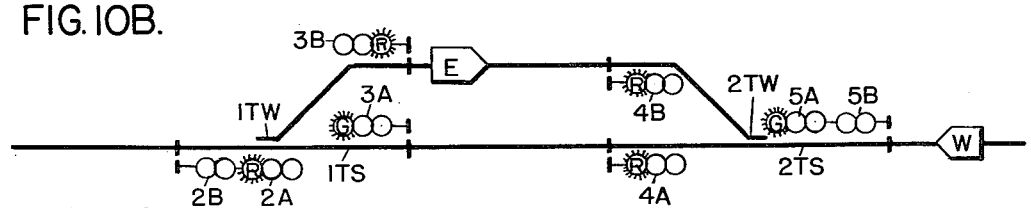

FIG. IOC.

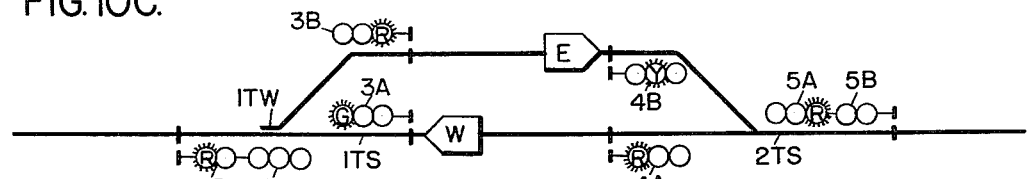

FIG. IOD.

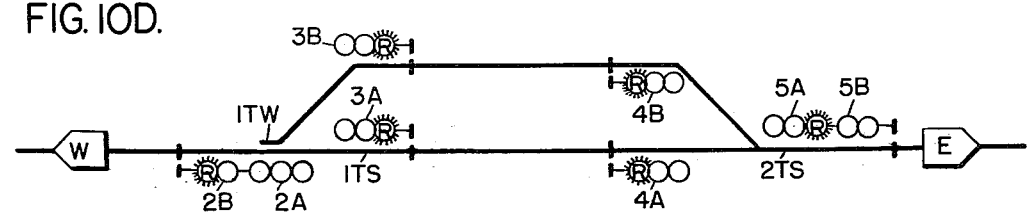

FIG. IOE.    MEET

| TAKE SIDING | WEST END | | | | EAST END | | | |
|---|---|---|---|---|---|---|---|---|
| | SIG. | CODE | SW | CODE | SIG. | CODE | SW. | CODE |
| EB | *RD | LS-SL | *R | SL | LD | SL-LS | N | LS |
| WB | RD | LS-SL | *N | LS | LD | SL-LS | R | SL |
| CHANGE TO | | | | | | | | |
| EB | *LD | SL-LS | N | LS | RD | LS-SL | R | SL |
| WB | LD | SL-LS | R | SL | RD | LS-SL | N | LS |

RD = RIGHT DIRECTION CLEARANCE
LD = LEFT DIRECTION CLEARANCE
R = REVERSE
N = NORMAL

*INVENTOR.*
N. D. PRESTON
BY
*Forest B. Hithcock*
HIS ATTORNEY

FIG. IIA.
PASS SEQUENCE
TWO EASTBOUND TRAINS
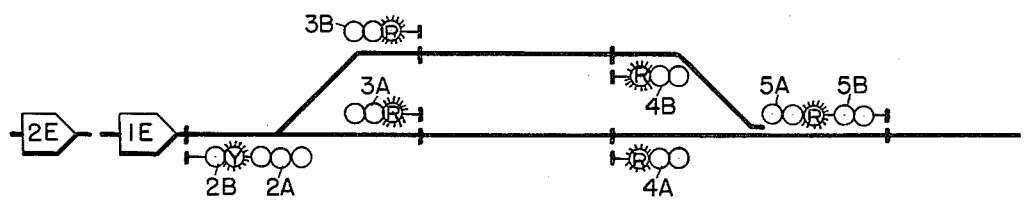
FIG. IIB.
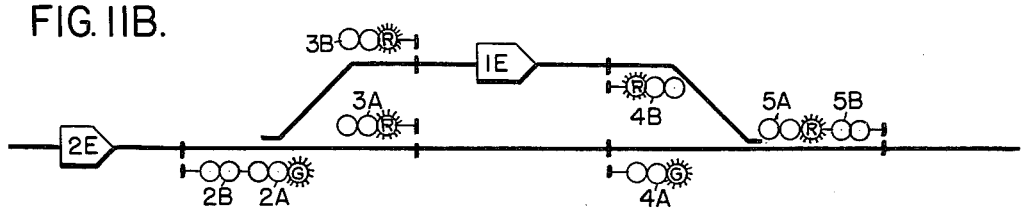
FIG. IIC.
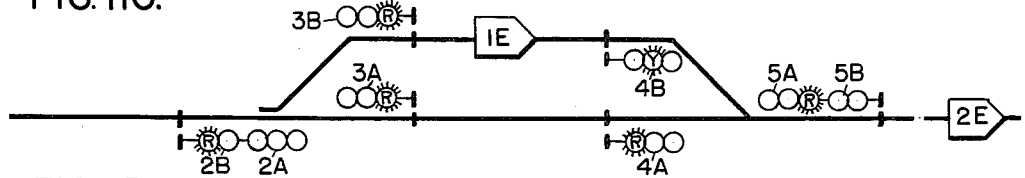
FIG. IID.
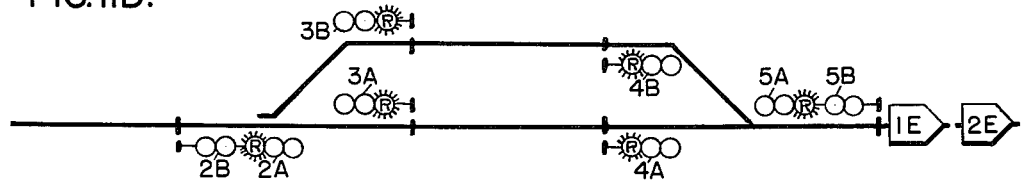
FIG. IIE.
PASS
| TRAINS GOING | WEST END | | | | EAST END | | | |
|---|---|---|---|---|---|---|---|---|
| | SIG. | CODE | SW | CODE | SIG. | CODE | SW | CODE |
| EB | RD | LS-SL | R | SL | RD | LS-SL | N | LS |
| WB | LD | SL-LS | N | LS | LD | SL-LS | R | SL |
| CHANGE TO | | | | | | | | |
| EB | RD | LS-SL | N | LS | RD | LS-SL | R | SL |
| WB | LD | SL-LS | R | SL | LD | SL-LS | N | LS |
*INVENTOR.*
N. D. PRESTON
BY
*Forest B. Hitchcock*
HIS ATTORNEY Feb. 26, 1963   N. D. PRESTON   3,079,494
AUTOMATIC CTC SYSTEM
Filed March 12, 1959   19 Sheets-Sheet 14

INVENTOR.
N. D. PRESTON
HIS ATTORNEY

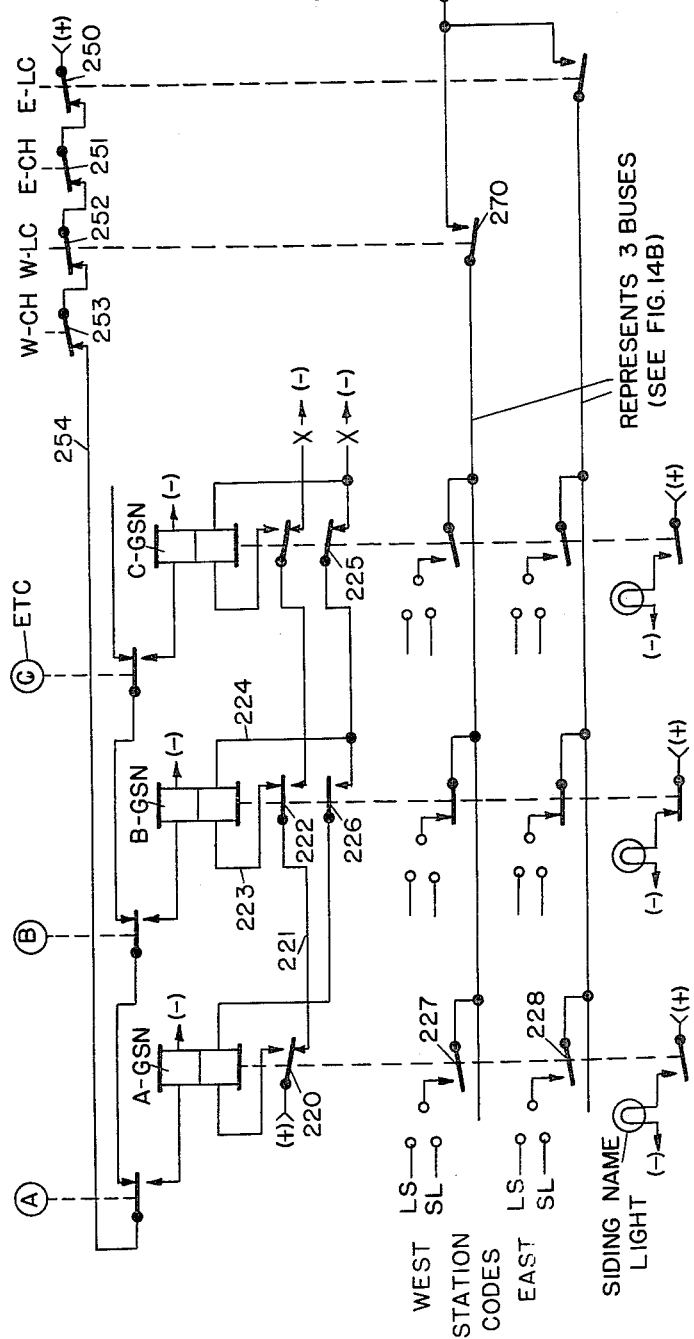

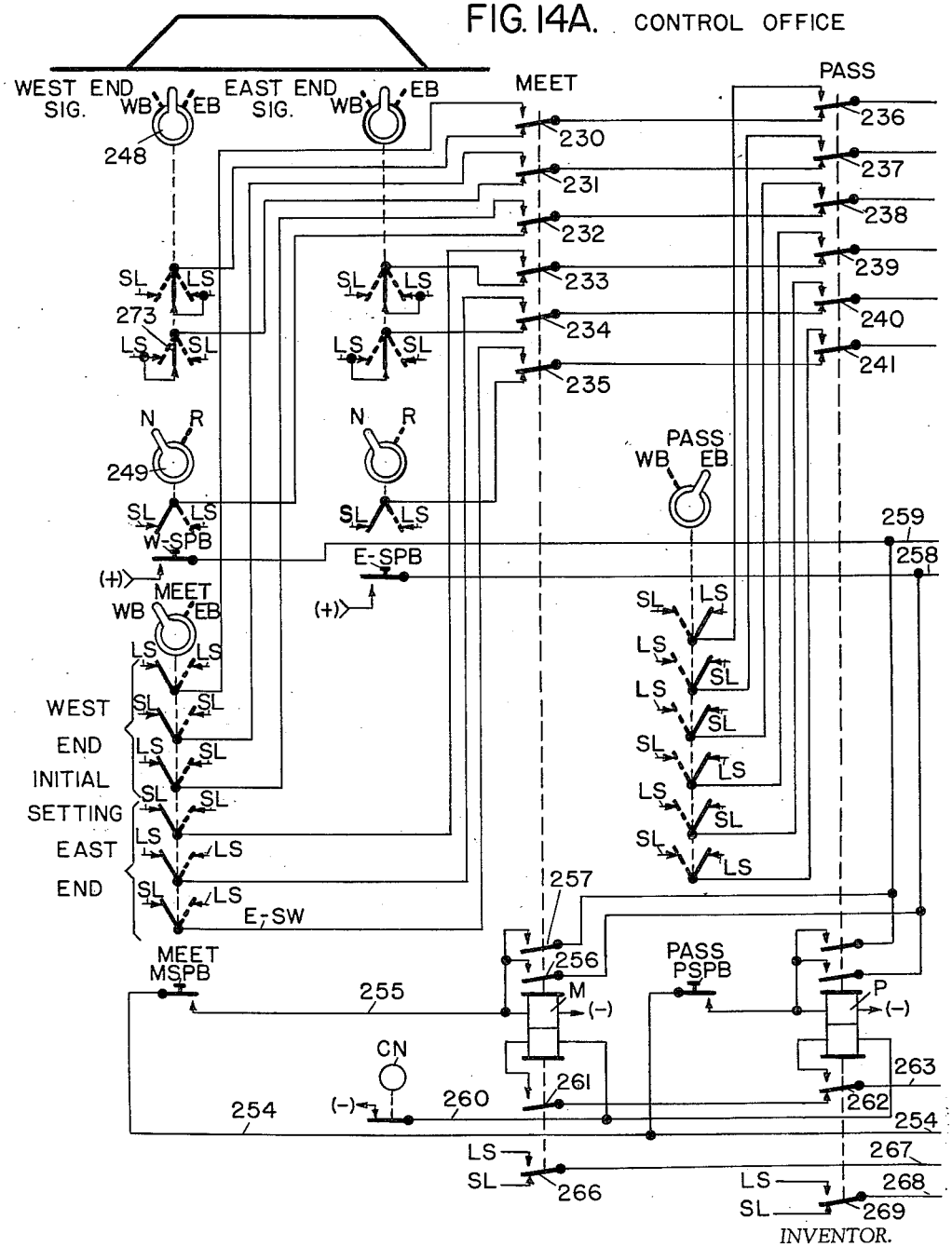
FIG. 14A. CONTROL OFFICE

Feb. 26, 1963 N. D. PRESTON 3,079,494
AUTOMATIC CTC SYSTEM
Filed March 12, 1959 19 Sheets-Sheet 18

AUTO. C.T.C. MODIFICATION-
TYPICAL MEET-PASS CONTROL IN FIELD

INVENTOR.
N. D. PRESTON
BY
HIS ATTORNEY

Feb. 26, 1963 N. D. PRESTON 3,079,494
AUTOMATIC CTC SYSTEM
Filed March 12, 1959 19 Sheets-Sheet 19

INVENTOR.
N. D. PRESTON
BY
HIS ATTORNEY

United States Patent Office 3,079,494
Patented Feb. 26, 1963

3,079,494
AUTOMATIC CTC SYSTEM
Neil D. Preston, Rochester, N.Y., assignor to General Railway Signal Company, Rochester, N.Y., a corporation of New York
Filed Mar. 12, 1959, Ser. No. 798,892
13 Claims. (Cl. 246—5)

This invention relates to systems of centralized traffic control (CTC) for the supervisory manual control of power operated track switches and signals at the ends of passing sidings on single track railroads, or analogous track layouts, and more particularly to such a system in which some of the switch and signal controls, which would ordinarily be provided manually by the operator, are automatically produced by the movement of trains themselves.

In the well-known system of centralized traffic control, commonly known as CTC, a large proportion of the train movements which are planned and executed by the operator to expedite traffic over a CTC territory, and more particularly in connection with the operation of single track railroads, require what may be termed a two-stage operation. First, the operator makes an initial setting of switch position and signal clearing preparatory to the arrival of the trains making the desired movement; and second, he carries out further manipulations to complete the desired train movement as the trains come along.

In the case of a "meet" between two opposing trains at a passing siding, for example, the switches and signals at a the ends of the siding are initially set, prior to the arrival of the trains, for one of the trains to take the siding (switch in the reverse position), while the other continues along the main track (switch in the normal position). The desired train movement, however, cannot be completed until the initial positions of the switches and the clearing of the signals for both ends of the siding are changed, as the respective trains reach the siding and pass out of the detector track sections at the siding ends. Another train movement of a similar character, calling for two-stage operation, is where one slow train (usually a freight) is overtaken and passed at a passing siding by a following fast train (usually a passenger).

In the conventional CTC systems at present available, the operator may readily condition the switches and signals at the ends of any given siding for a meet or a pass; but this does not complete his work. He must be alert to changes in the indications of occupancy of detector track sections at the siding ends and take the appropriate manual action with respect to these siding ends promptly, in order tthat the desired train movement may be carried out with a minimum of delay. If he does not act as soon as the movement of trains into and out of the detector track sections permit supplementary manipulation, one or more of the trains are unduly delayed.

In carrying out this supplementary manipulation to complete such train movements, the operator in effect is acting merely as a robot, which is spurred into action by operation of occupancy indication means, and which provides new switch and signal controls already determined by the nature of the train movement to be completed. In other words, no choice or judgement is involved in completing train movements of this character, such as meets or passes, and the manipulation required by the operator in the present systems may be accomplished automatically. In so doing, the movement of traffic as planned by the operator is not impaired in any way, and may in fact be expedited to the extent that automatic means can eliminate oversights, delays and errors in manipulation on the part of the operator.

In addition to the features of automaticity just discussed, it is desirable to simplify and facilitate the manipulation required of an operator in his supervisory manual control of traffic in a CTC installation, so that he can act more quickly, and with less change of error, to carry out his planning of train movements, thereby being able to handle larger territories, or have more free time to plan the train movements to a better advantage over the same territory.

With these and other considerations in mind, it is proposed in accordance with the present invention to provide control facilities which will enable an operator to provide by a simple and single manual movement of a chosen control device to exercise all of the supervisory control needed for positioning the switches and clearing the signals at the ends of a passing siding for any desired train movement into or out of the siding or adjacent stretch of main track, either in connection with carrying out one step or stage of the operation for any kind of train movement desired, or making an initial setting for certain train movements, such as meets or passes where the move may be automatically completed by the trains themselves.

The primary object of the present invention is to provide control facilities having these and other desirable attributes, which will utilize to the best advantage the operating characteristics of the present conventional CTC systems.

Generally speaking, and without attempting to define the nature and scope of the present invention, it is proposed to supplement and modify the type of control devices now ordinarily used in CTC systems, more particularly in connection with those systems using code type communication to a number of distributed field locations, so that the operator's manipulation will be simplified and facilitated in a manner permitting him to handle expeditiously and with little chance of error the same volume of traffic over more extensive CTC territory, or a larger volume of traffic with less delay over the same CTC territory.

Among other things, it is proposed to employ a master control panel arrangement, in accordance with the principles disclosed in the prior application of Preston and Hitchcock, Ser. No. 536,468, filed September 26, 1955, now Patent No. 2,914,662. Self-restoring rotary switches, one for each track switch position, are employed in accordance with the persent invention to perform the function of the stay-where-put two-position rotary switches for controlling the track switches, three-position rotary switches for controlling signal clearance, and code start push buttons of the present systems, for controlling the track switch position and signal clearing for train movement into and out of the siding or the main track at one end of a passing siding. A single movement of a selected route switch in the desired direction of traffic constitutes the complete manipulation required of the operator to make the switch and signal setting for a desired train movement at a siding end.

For train movements, such as meets and passes, to be automatically completed by the trains, a single movement by the operator of a selected self-restoring switch for the desired train movement completes his manipulation in these cases. The master route switch for separate track switch and signal control at the individual siding ends, and the master automatic control switch for meets and passes on the master control panel may be allocated to control of the switches and signals for any selected siding or control area by actuation of siding selector push buttons respectively relating to such control locations.

In one form of the invention, the relays and circuit means conditioned by manual control for completion of a meet or pass in response to movement of the trains themselves, are all located in the control office, and the desired automatic control is automatically consummated by the initiating action of occupancy indication means in the control office, in accordance with the particular switch and signal control dictated by the condition of control office means.

In another form of the invention, the apparatus for the automatic completion of meet or pass train movements is located in the field, and conditioned by special controls from the control office for immediate and direct operation by the field detector track relays.

The basic functions and mode of operation of the invention are applicable to various types of CTC installations, and to various specific forms of direct wire or code communication systems. The specific adaptations and modifications for such various applications and uses will be readily apparent to one skilled in the art from a consideration of the particular embodiments of the invention herein disclosed, which for convenience has been assumed to involve a conventional stretch of single track with simple distributed passing sidings only, and type of multiple station time code communication system commonly used, and disclosed for example in the patent to Hailes et al., No. 2,399,734, dated May 7, 1946.

Various other objects, characteristic features, attributes and advantages of this invention will be in part apparent, and in part pointed out as the description progresses.

In describing the invention in detail, reference will be made to the accompanying drawings, in which like reference characters designate corresponding parts throughout the several views, and in which:

FIG. 1 is a diagrammatic representation of a portion of a miniature track diagram of the actual track layout in the field of that part of the railroad being controlled by the system of the present invention;

FIG. 2 is a general view of the master control panel;

FIG. 3A is a schematic representation, similar to a block diagram, showing the actual track layout in single line form, and representing the code communication system interconnecting the various field stations with the central control office;

FIG. 3B is a more expanded representation of the block diagram of FIG. 3A showing the transmission of the various code steps into the communication apparatus at the control office and the resulting controls at a typical field station No. 1 which are governed thereby. Also shown in more detail than in FIG. 3A are typical field apparatus which transmit indications via the code communication system back to the control office.

FIG. 4 illustrates the typical field application circuits associated with one end of a passing siding, and more particularly shown associated with the west end of siding "A" illustrated in FIG. 3A.

FIG. 5 is a schematic representation, similar to a block diagram, of the organization of circuits and devices in the control office between the control buttons and the code type communication system for controlling a typical siding "A" in the field.

Figure 6B:
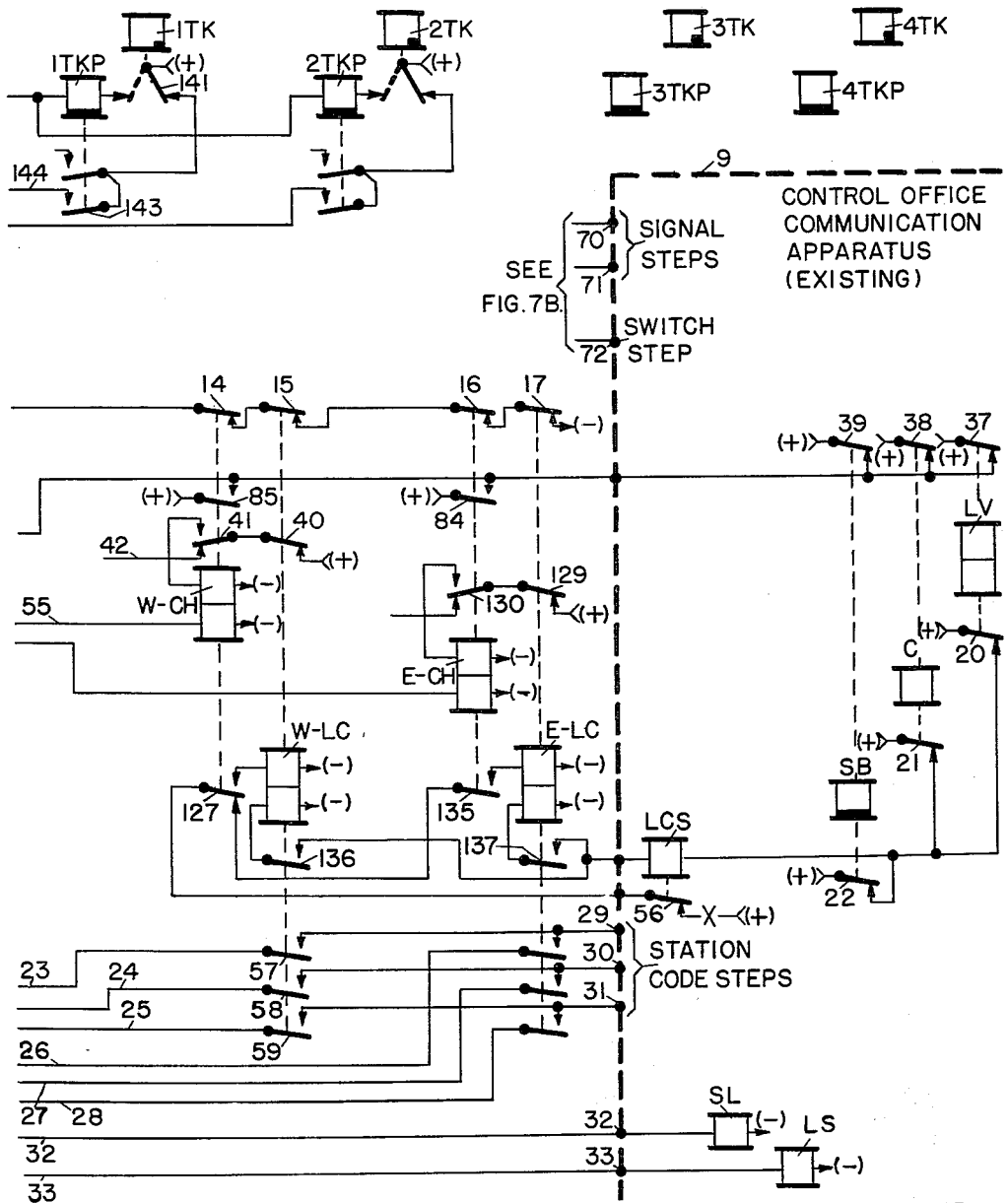
Figure 7B:
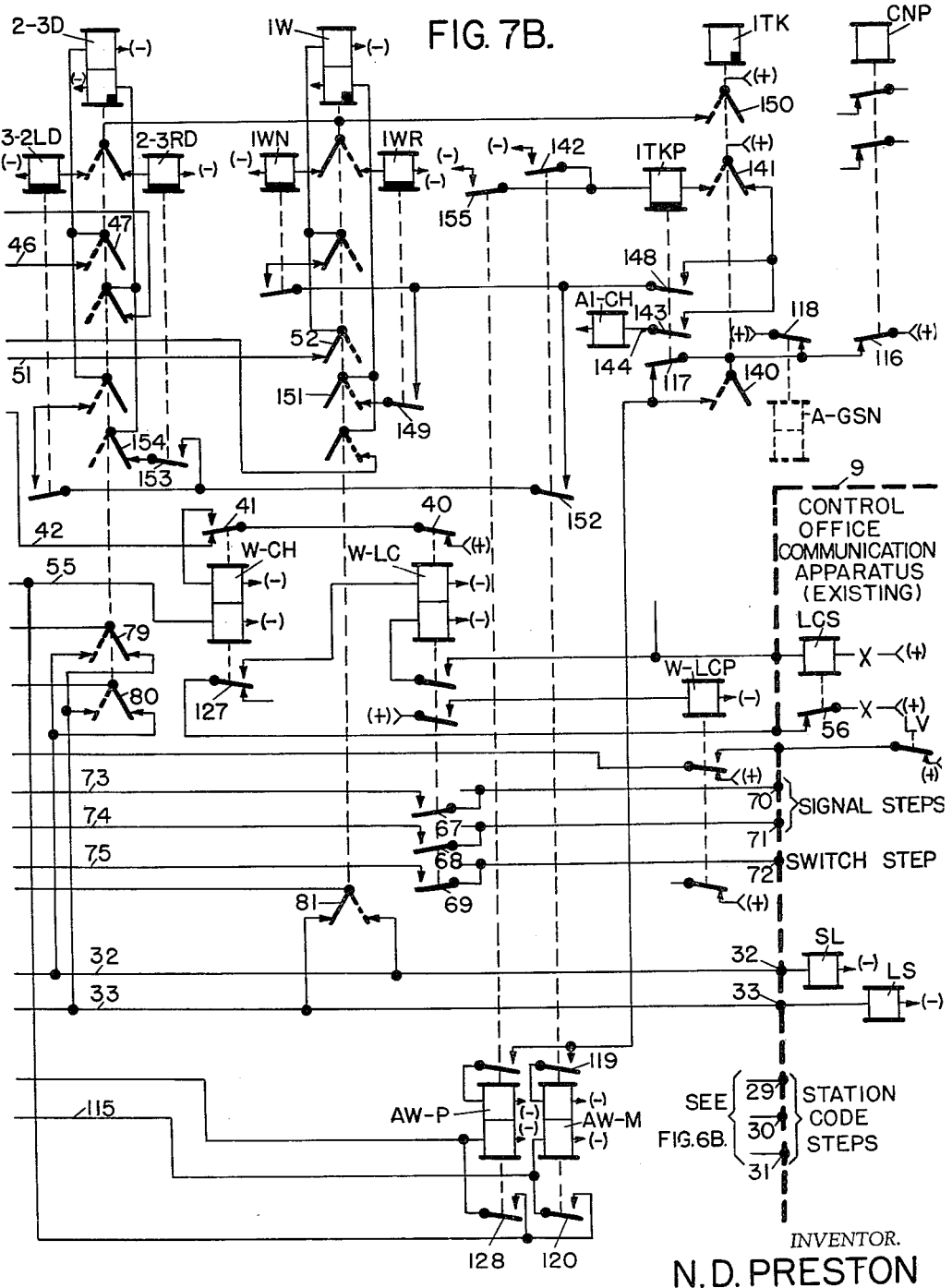
Figure 8:
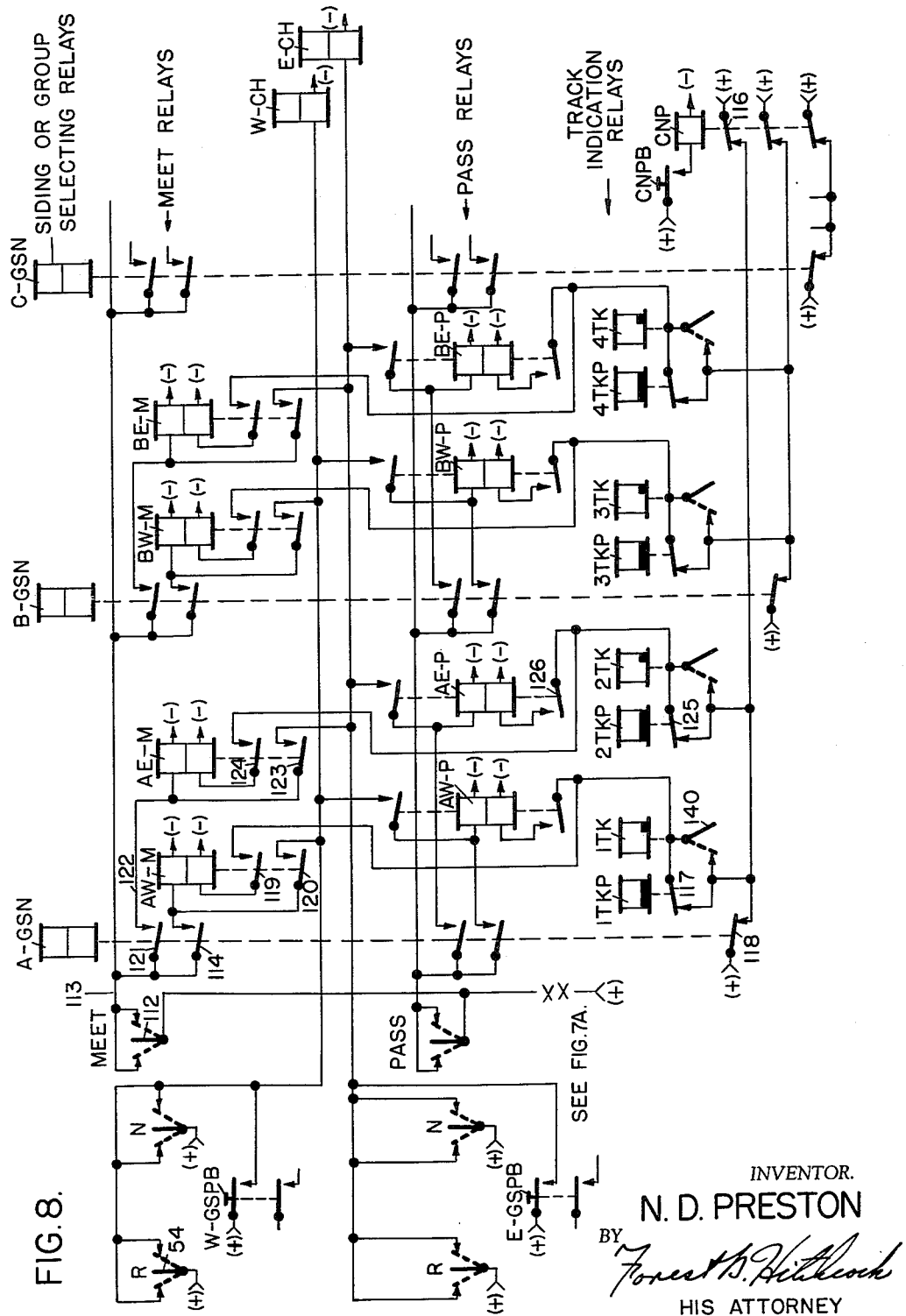
Figure 14B:
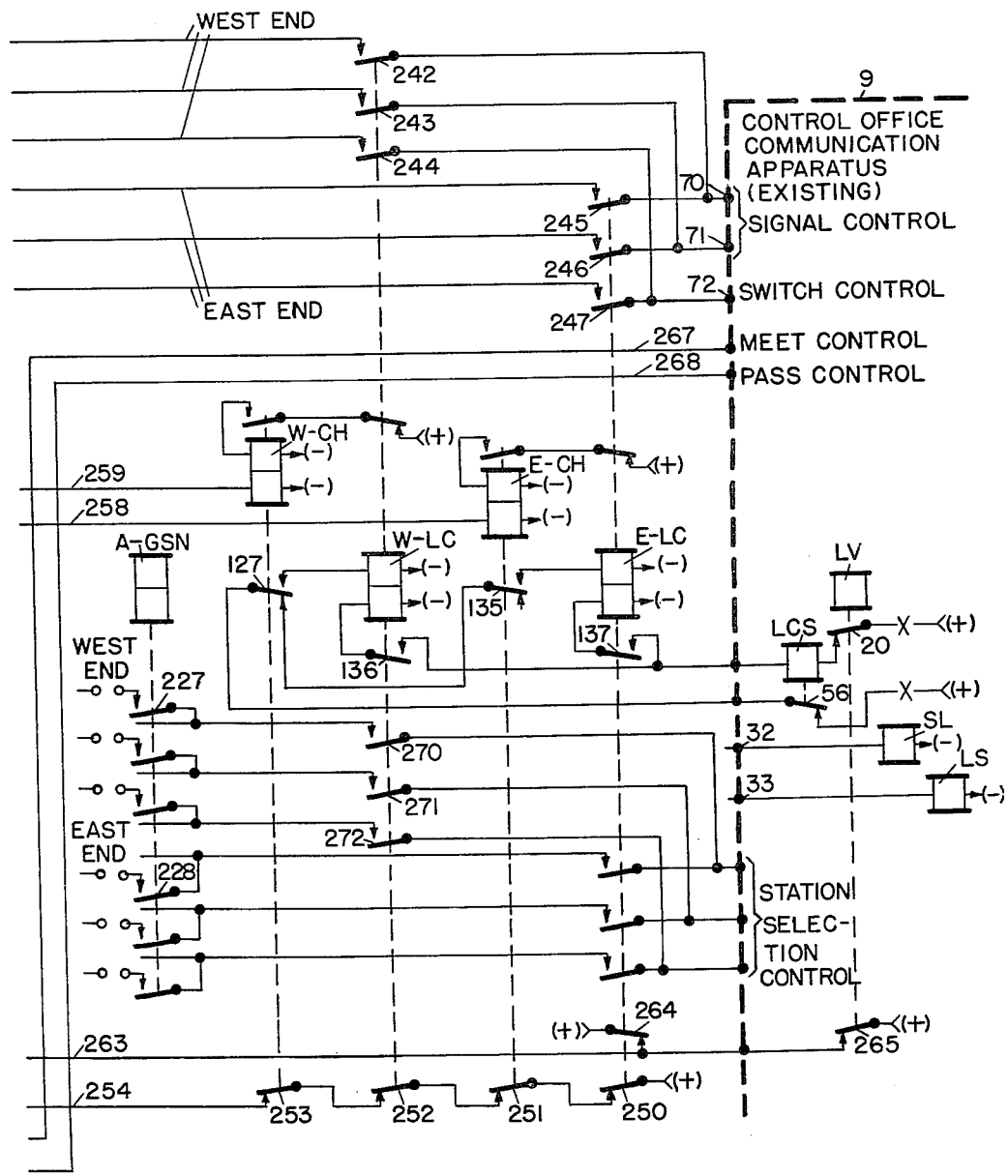
Figure 15A:
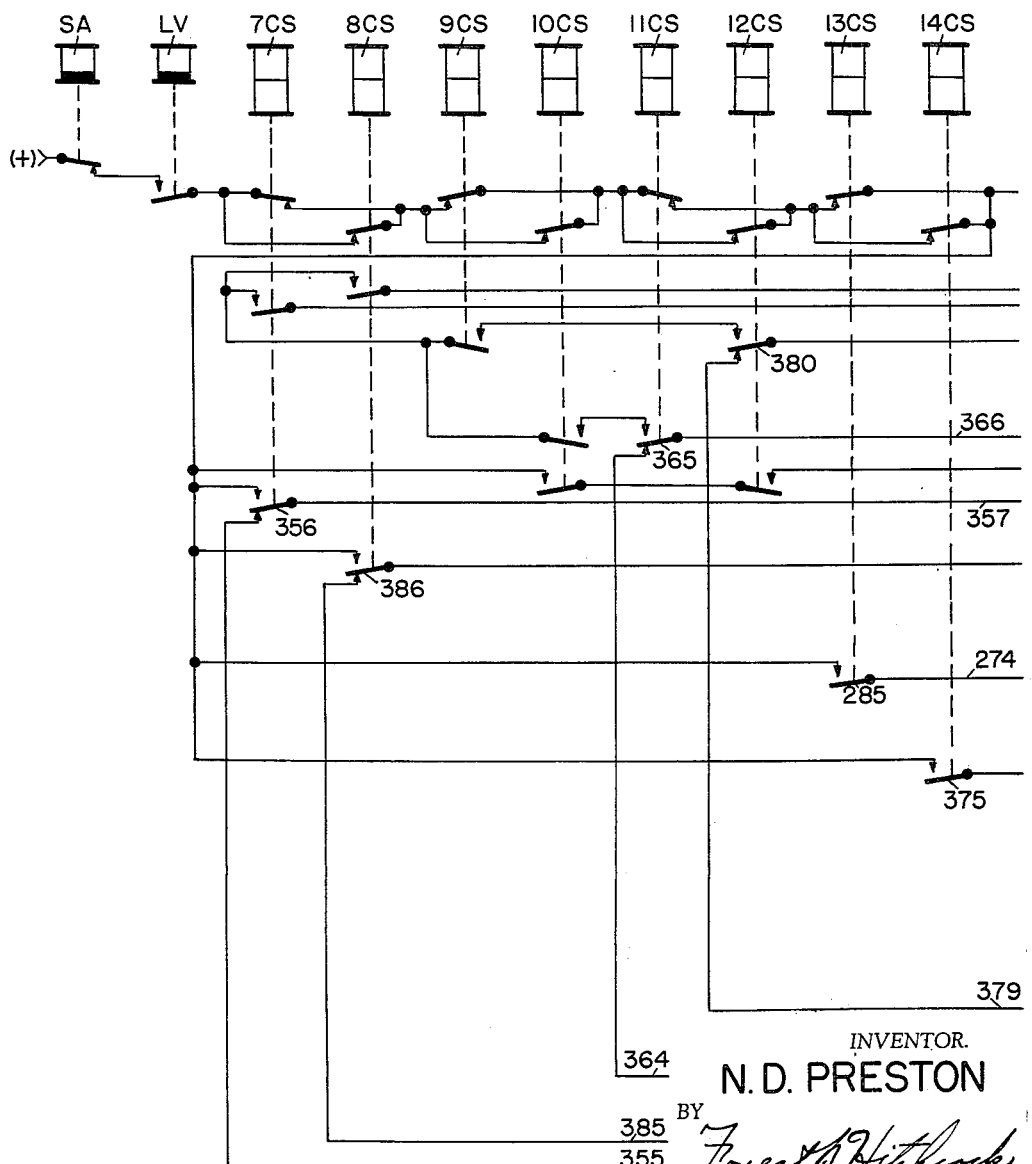
Figure 15B:
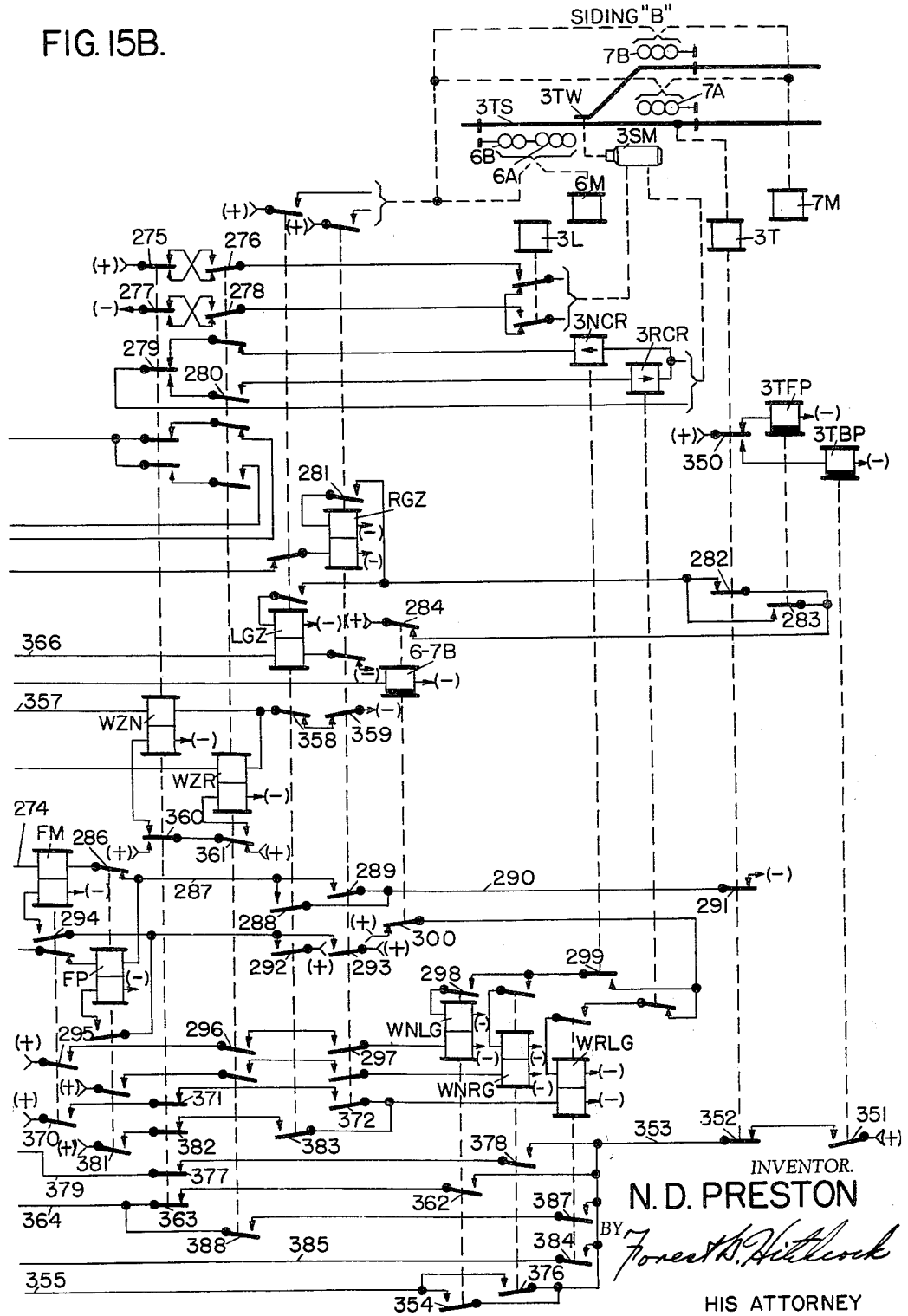

FIGS. 6A and 6B illustrate the circuits and associated relays located in the control office and related to the selection of sidings subject to manual control and the automatic starting of the code type communication system connecting the office with the various field stations;

FIGS. 7A and 7B illustrate the circuits and relays in the control office relating to the setting up of switch and signal controls for transmission to the field stations both for individual manual control and in connection with the automatic operation in connection with meets and passes;

FIG. 8 illustrates in a more detailed way the circuit arrangements and relays in the control office relating particularly to the automatic meet and pass operation and including cancellation circuitry for a plurality of sidings;

FIG. 9 illustrates the arrangement of parts and circuits in the control office relating to the display of indications for one end of a siding and more particularly relating to the west end of siding "A";

FIGS. 10A through 10E show explanatory charts and diagrams for the typical meet sequence;

FIGS. 11A through 11E show explanatory charts and diagrams for the typical pass sequence;

FIGS. 12A, 12B and 12C show sequence diagrams for typical operations;

FIG. 13 illustrates the circuits and relays used in the control office for siding selection as employed with a modified form of circuit organization effecting the automatic meet and pass operation in the field;

FIGS. 14A and 14B relate to a modified form of the system and more particularly show the circuits and relays located in the control office which is organized to provide for the automatic operation in connection with meets and passes to be effective for controlling apparatus located at the field stations; and FIGS. 15A and 15B relate to a modified form of the system and more particularly show the circuits and relays located at a field station in place of the application field circuits of FIG. 4, and shown in particular for the west end of siding "B."

In the present illustration of the invention, the parts and circuits have been shown diagrammatically, together with certain conventional symbols, in the interests of simplicity, rather than attempt to illustrate in detail the specific construction and arrangement of parts that would be employed in practice. For example, symbols and arrows are used to indicate connections with the terminals of suitable sources of energy for the various circuits; and the windings and contacts of relays are shown diagrammatically in conformity with recognized conventions. Systems of this character usually involve a repetition or duplication of similar parts and circuits; and in the interests of simplicity, the present showing is limited to certain typical circuit organizations, which are duplicated to make up the complete system, at least in function and mode of operation.

The assignment of relay and other electrical apparatus symbol designations throughout this specification has been done primarily on the basis of marrying this apparatus to that of the prior art without duplication of nomenclature. In cases where duplication arose it was sometimes necessary to add more descriptive or more exacting location designations to such apparatus, each of which will be described in turn as it appears throughout this specification. In some instances a location code is used to identify certain apparatus pertaining to that location, such as siding "A" west end, in which case the "AW" designation prefixes the fundamental designation of the device and is set apart from it by a dash.

The symbols (+) and (—) are employed to indicate the positive and negative terminals respectively of suitable batteries or other sources of direct current; and the circuits with which these symbols are used always having current flowing in the same direction.

DESCRIPTION OF APPARATUS

*Track diagram.*—In the system of this invention, it is contemplated that the usual miniature track diagram 5 of FIG. 1 for the track layout of the territory under supervisory manual control, will include a graphic representation of the portions of track and switches of the track layout (see FIG. 3A) in the usual manner together with symbols showing the location of the signals and the direction of traffic governed thereby. This track diagram 5 will include appropriate indications of occupancy of detector and approach track sections, operated position of switches, and clearing of signals, in accordance with usual practice. These indicators are assumed to be controlled by a suitable code communication system, in a manner disclosed, for example, in the patent to Hailes et al., No. 2,399,734, dated May 7, 1946; but it is to be understood that any other suitable code communication system may be employed as disclosed, for example, in the prior application of N. B. Coley, Ser. No. 359,727, filed June 5, 1953, now Patent No. 2,907,981, or the prior patent to H. C. Sibley, No. 2,794,179, dated May 28, 1957.

The track diagram 5 for the system of this invention also includes suitable indicating means 6 for distinctly identifying the particular siding, or equivalent control area, then subject to master control. In the arrangement shown (see FIGS. 1 and 9) a name, combination of letters or numbers, or equivalent symbol identification media is located on the track diagram adjacent to each siding, and is illuminated automatically when the siding is manually selected to be the one operatively connected with the master control panel.

Other changeable indicators preferably employed on the track diagram 5 for the system of this invention comprise automatic meet-pass control indication lamps for lighting up letters M or P, or equivalent symbolization for "meet" and "pass," adjacent to each siding when the apparatus for this siding has been manually conditioned for automatic completion of a meet or pass by movement of the trains themselves. For example, the meet-pass indicator lamp A–MPL is associated with siding "A"; and similarly indicator lamp B–MPL is associated with siding "B." Also, indicating lamp UL (signifying unfinished business) is preferably associated with each siding end on the track diagram to indicate when new controls have been sent to that siding end, but have not yet produced the desired results. For example, the unfinished business indicator lamp AW–UL is associated with siding "A" at the west end; and similarly the indicator AE–UL is associated with siding "A" at the east end. A similar arrangement is used for siding "B." The information provided by these additional indications assists the operator in his manipulation, as later explained.

The track diagram 5 in the system of this invention does not include any manual control devices arranged or grouped in any geographic relationship to the actual track layout; and hence, the track diagram may be designed and proportioned for the purpose of displaying the desired information for the operator to the best advantage.

*Master control panel.*—The master control panel 7, schematically illustrated in FIG. 2, comprises in effect three sections or portions, i.e.: (*a*) siding selector section for manual selection of the siding to be subject to master panel control, (*b*) manual control section for governing the switch and signals for the siding ends either separately, or jointly, as may be expedient for handling the various switching and traffic train movements, and (*c*) automatic control section for providing the initial setting of switch position and signal clearing at both ends of the siding for certain train moves, such as meets and passes, and also conditioning apparatus enabling the movement of the trains themselves to complete such train movement, without any further manual act by the operator.

(*a*) The preferred form of siding selector shown (see FIG. 2) comprises a row of self-restoring push buttons with letters, such as A, B, etc., or like siding identification symbols located thereon, or adjacent thereto, preferably in the same order from left to right as the geographic locations of the sidings in the CTC territory. These siding selector push buttons A, B, etc. control a circuit arrangement of FIG. 6 to provide for selective energization of group selection relays, such as A–GSN, B–GSN, etc., one for each siding, and one siding at a time as its push button is actuated, subject to certain interlocks and other operating conditions more conveniently considered later in describing a typical operation of the system.

(*b*) The manual control portion of the master control panel 7, in the particular arrangement illustrated, comprises an abbreviated miniature track layout, such as a passing siding, characteristic of the several control areas which from time to time may be made subject to manual control. The manual control devices for a siding end comprise two self-restoring route switches, one for each of the respective normal and reverse positions of the track switch, and also preferably located (as indicated in FIG. 2) to be correlated by physical relationship with the switch position governed thereby, together with a self-restoring "signals-to-stop" push button switch for manually putting to "stop" a cleared signal at the siding end.

A single movement for a given route switch, such as switch 34 for controlling the reverse position of the track switch at the left or west end of the siding, from its middle position shown, to the right or to the left in accordance with the east or west direction of train movement desired, is all the manipulation required of the operator for a train movement into or out of the siding. The manual actuation of a route switch, such as switch 34, automatically initiates operation of the code communicatoin system, as well as designates the particular track switch and signal control codes to be transmitted for the desired train movement, all in a manner more conveniently discussed later in describing a typical operation of the system.

The supervisory manual control usually exercised by the operator is to individually position switches and clear signals for trains to make the desired movements. Ordinarily, the signals after being thus manually cleared, are put to stop automatically by the trains. However, the operator does at times have occasion to put a signal to stop by manual control, a condition usually brought about by his own mistake or premature action. In the system of this invention, a special control for manually putting a signal to stop consists in actuation of the signals-to-stop push button switch for the proper siding end, after this siding has been selected in the usual manner. This actuation automatically initiates a control cycle, and sets up for use only during that cycle a stop signal control code.

(*c*) The automatic control section of the master panel comprises self-restoring three-position rotary switches specifically assigned for designating the special train movements to be automatically completed by the trains themselves. Specifically, one rotary switch 35 has been designated "meet" and another 36 has been designated "pass."

These rotary switches 35 and 36 for such special train-completed moves are movable, from the normal middle position shown, to the right or left, in accordance with the kind of train movement desired. In the case of the "meet" switch, the movement to the right or to the left determines whether it is the eastbound train or the westbound train that is to take the siding. Trains making a meet are inherently moving in the opposite direction, so that there is no direction of traffic to be designated. In the case of an overtake or "pass," however, the trains involved may be travelling in either direction, so that the "pass" rotary switch 36 must be moved in one direction or the other to conform with the direction of traffic being controlled.

*Code communication system.*—In the type of switch and signal control system for which this invention is best adapted, the passing sidings, or similar track layouts, for the various control areas of the CTC installation, will be distributed at various field locations remote from the central control office, so that a suitable form of multiple station code communication system will be used for transmitting over a limited number of line wires the necessary controls for switch and signal operation at the various field locations, and bring back to the control office suitable indications of switch position, signal clearing, track section occupancy, and the like. The system of this invention is adaptable for use with any suitable code communication system of this kind.

For the purposes of the present disclosure, it is assumed that the code communication system will be of the two-wire multiple station time code type, employing line circuit shunting and station code superiority for transmission of indications, such as disclosed in the patent to Hailes et al., No. 2,399,734, May 7, 1946. It should be understood, however, that the code communication may be of the type, conveniently called a "Syncrostep" system, such as disclosed, for example, in my prior application Ser. No. 359,716, filed June 5, 1953, now Patent No. 2,907,980, or a system involving different carrier frequencies, as disclosed, for example in the patent of Albrighton et al., No. 2,802,199, dated August 6, 1957.

These various types of code communication systems, generally speaking, have the common characteristic that a series of message or channel circuits are set up or scanned in sequence at the transmitting and receiving locations, and are utilized for the application and reception of code elements of distinctive character to define station codes, and particular controls or indications with respect to such station. The specific structure and operation of means for providing such message circuits, together with initiation of control and indication cycles for control office and field starts, and various other functions, may be disregarded. It is sufficient for the purposes of understanding the present invention, to indicate how the apparatus and circuits of this invention are associated with, or connected to, terminals or conductors of contacts, or code responsive relays involved in the transmission and reception of the desired controls and indications. Accordingly, as shown in FIGS. 3, 5, 6, 7, 9, etc. terminal arrangements represented at the control office communication apparatus 9 serve to illustrate the interconnections between the circuits of the specific embodiment of the invention here illustrated, and the circuits of the code communication system disclosed in the Hailes et al. Patent No. 2,399,734 above mentioned.

Briefly reviewing the more significant parts and functions of the Hailes et al. time code system here assumed, the character of the code elements for station selection and controls transmitted during the successive message periods as determined by the energization of a long-short relay LS or a short-long relay SL (FIG. 2B of Hailes et al. patent) over 33 and 32 buses respectively connected through code jumpers, are control codes selecting contacts to message circuits sequentially established by operation of stepping relays V1, V2, etc. In the present illustration, these message circuits are identified as terminals, three for station code steps, two for signal control steps, and one for a switch control step (see FIG. 3A).

In the type of communication system under consideration, switch and signal controls are transmitted to the field stations at the respective ends of the passing sidings, one field station at a time, on a time sharing basis. The functions of transmitting station codes to various field stations, one at a time, followed by the controls pertaining to that particular field station are performed by code start change relays, such as CH2 and CH3 of Hailes et al., FIG. 2A, and associated location code determining relays, such as LC2 and LC3. The control circuits for these CH and LC relays, as illustrated and described in the patent in question, is such that only one LC relay may be energized at a time to dictate the station code and is followed by switch and signal controls transmitted during a given control cycle, even though a number of change relays CH have been actuated. A different, but somewhat similar, form of this invention for manual and automatic siding selection, as explained more in detail later in describing the typical operation.

Referring to FIG. 3A it will be noted that the rectangle designated as the control office communication apparatus 9 has terminals to which wires are connected for establishing the station selection code steps, the switch code step, and the signal code steps, the details of which are typically illustrated in FIGS. 6A, 6B, 7A and 7B; and the supply of energy to these terminals causes the transmission of the appropriate controls. More specifically, the transmission of the station codes, the switch code and the signal code results in the distinctive control of the switch relays WN and WR, the signal relays RGZ, LGZ and B¹ shown in FIG. 5 of the Hailes et al. Patent No. 2,399,734. The present invention contemplates that the same operation will take place in the present disclosure and shows in FIG. 3A of this disclosure the corresponding relay designation for each field station with suitable preceding numerals to characterize the particular switches and signals with which such controls are associated. In order to make the disclosure definite in this connection, FIG. 4 shows the specific control for the relays 1WZN, 1WZR, 2RGZ, 3LGZ, and 2–3B organized in a very similar manner to FIG. 5 of the Hailes et al. Patent No. 2,399,734, and typical of the control for each of the field stations. The 1WZN and 1WZR relays position the #1 switch mechanism to normal and reverse respectively, the 2RGZ relay governs the right direction clearance of #2 signal mechanism, the 3LGZ relay governs the left direction clearance of #3 signal mechanism, and the 2–3B relay places both #2 and #3 signals to "stop." This field reception of control is indicated in FIG. 3B where the above switch and signal controls are applied to wires 201 through 205 at field station #1 and the circuit details can be found by referring to these same wires in FIG. 4.

With regard to the transmission and reception of indications of occupancy, switch position and the like, it is contemplated this will be accomplished by the same arrangements for automatic field start, establishing field station preference or priority, registration of the particular field station sending indications, and the registration of the indications on mag-stick relays as disclosed in said Hailes et al. patent.

More specifically, the Hailes et al. Patent No. 2,399,734 shows the transmission of indications in its FIG. 3B for an approach track ATR, a detector track TR, a signals-at-stop relay for the left direction LM, and a signals-at-stop relay for the right direction RM. The transmission of such indications results in the proper positioning of corresponding magnetic stick type relays in the central office shown in FIG. 2A as relays ATK, TK and GK.

A similar transmission of indications is contemplated in the present disclosure, and this has been illustrated in FIG. 3A by designating for each field station the particular relays which act upon the code communication system for the transmission of indications. More specifically, for the west end of siding A, the track relay 1T, the 2A and 2B signals monitor relay 2M, the 3A and 3B signals monitor relay 3M, and the correspondence relays 1NCR and 1RCR, are shown as transmitting indications from the field which result in the reception of indications at the control office and the appropriate energization of terminals as indicated in FIG. 3B at the left of the dotted rectangle designated as the "control office communication apparatus" 9. For the detailed illustration of the associated magnetic stick relays reference should be made to FIG. 9 where wires 104 through 108 can be followed to the track occupied indication relay 1TK, the switch normal indication relay 1WNK, the switch reverse indication relay 1WRK, the right clearance for #2 signal indication, and the left clearance for #3 signal indication. These relays are shown as typically controlling the indication lamps of the west end of the siding "A" on the miniature track diagram 5 of FIG. 1. It is of course to be understood that during the transmission of indications suitable field station registration codes are transmitted to select the proper station relay ST so that these particular terminals are connected to the appropriate magnetic stick relays for the field station then transmitting to control the indicators for the corresponding apparatus appropriately located on the track diagram. This has not been shown in detail because such station registration has been completely disclosed in the Hailes et al. Patent No. 2,399,734 resulting in the energization of station relays ST indicated in FIG. 2A of the Hailes et al. patent. In this way, the appropriate magnetic stick relays for the several stations are connected for the proper indication cycles involved.

In addition to the field application circuits typically shown in FIG. 4, it is of course understood that many of the safety circuits and features and many of the control circuits have been indicated merely by dotted lines which are to represent conventional controls and connections to provide various features such as approach locking, time release, and stick locking, correspondence circuits, and the appropriate interrelated block signal circuits. Since such circuits and organizations are well known in the art and are employed in general practice, they are of course considered desirable and a part of the system but have not been shown in detail as a part of this disclosure.

*General organization of disclosure.*—The main form of the invention has been illustrated in FIGS. 1 through 12; and in this form all of the special apparatus and circuits required for the automatic operations are located in the control office, and no material change or addition to conventional field apparatus is required. This form, however, does require the reception of indication codes at the control office upon the passage of trains in order to effect some of the automatic operations.

In the modified form of the invention shown in FIGS. 13 through 15, the field station apparatus must include special circuits and devices in addition to or in lieu of certain apparatus and circuits required at the control office in order to automatically complete certain switch and signal control operations for the meet and pass functions of the system without awaiting the transmission of indication codes to the office and the return transmission of control codes.

These statements with regard to the general organization are made so that it will be easier to understand the present invention, since the attention can be directed more particularly to the control office apparatus in connection with the main form keeping in mind that the field station apparatus is substantially the same as employed in recognized practice. To facilitate in the concept of the organization of this apparatus at the control office, the block diagram of FIG. 5 is included. The control switches of the master panel are shown with their related apparatus in block form and major groups of buses have been indicated by dotted lines. The outgoing code transmitting buses are shown routed by the master W–LC and E–LC relay contacts and these buses are again routed to the appropriate code jumpers and control contacts by the several group selection relays A–GSN, B–GSN, etc.

However, certain of these buses selected by the group selection relays A–GSN, etc., must be controlled by special relays. Associated with each siding are groups of relays, one group is for west end and the other group is for the east end. Specifically, FIG. 5 shows these two groups of relays for the siding "A" associated with the group selection relay A–GSN. It should be understood that the group selection relay B–GSN for the siding "B" has a similar group of relays associated with it; and the same is true with each of the other groups of siding selection relays.

These relays indicated as characteristic of the sidings have been given reference characters appropriately associating them with the siding to which they belong, whereas other relays are designated according to the track section or track switch or signal with which they are associated in the field to make it easier to understand the particular control codes with which they are concerned. No effort will be made at this time to describe the entire function of the system with regard to this particular FIG. 5, but reference may be made to it from time to time as the more specific description progresses.

TYPICAL OPERATIONS

In describing in detail the operation of the specific embodiment of the invention herein disclosed, and particularly in connection with tracing circuits, it is expedient to give consideration to certain typical operations of the system. The operation of the system as a whole comprises in general a repetition of such operations for various trains, or analogous operations differing from the typical one specifically described merely in the particular relays or circuits involved, on account of a difference in direction of train movement, train position, or the like.

The system of this invention takes care of different kinds of train movements in different ways. Generally speaking, many of the train movements to be made under supervisory manual control in handling and expediting traffic on single track railroads, relates to the positioning of the switch and clearing of a signal for one end only of a passing siding. For example, a train approaching a given end of a passing siding should, under certain conditions, be switched into the siding and held there, for the purposes of making a meet with one or more opposing trains, or to be overtaken and passed by one or more following trains; whereas, under other conditions, the train in question should be directed to continue along the main track, either to the other end of the siding, or perhaps beyond. Sometimes, as for example in connection with the operation of local freights or work trains, a train (or even a part thereof) may be moved into and out of the siding, or associated main track section, in what may be termed a switching move.

It is contemplated that the operator will use the manual control section of the master panel to provide the manual controls for such train moves primarily relating to one siding end.

*Route setting for individual siding ends.*—As a typical example of a train movement for describing the operation of the system for such manual control, assume an eastbound train is approaching the left-hand or west end of a given passing siding, say the siding "A" of FIG. 3A and represented on the track diagram of FIG. 1, and the operator desires to direct this train into such passing siding. The following operator manipulations, and sequence of relay operation, and circuits will be involved for this typical train movement.

(1) First, the operator actuates the siding selector push button A of FIG. 2 to render the master panel effective to control the particular siding "A" in question.

Referring to FIGS. 6A and 6B, assume that the code communication system is not then acting, or has not been conditioned to transmit controls to any part of the CTC territory, so that relays W–CH, W–LC, E–CH and E–LC are deenergized, and also master group selection relay MGXN is deenergized. The actuation of push button A closes a circuit from (+), through its back contact 10 readily traced over wire 11 through the upper winding of the corresponding group selection relay A–GSN, bus wire 12, back contact 13 of selection relay MGSN, back contact 14 of west change relay W–CH, back contact 15 of the west location code relay W–LC, back contact 16 of the east change relay E–CH, and back contact 17 of the east location code relay E–LC, to (—).

The group selection relay A–GSN, thus initially energized, is maintained energized by a stick circuit through its front contact 18, bus wire 19, master group selection relay MGSN, and contacts 37, 38 and 39 in parallel of last stepping relay LV, control relay C and step bridging relay SB respectively. Thus, at the same time a stick circuit through the lower winding of relay A–GSN is formed, relay MGSN is energized to disconnect at its back contact 13 (—) from the upper windings of all the group selection relays GSN, so that actuation of any other selector push button does nothing.

The energization of relay A–GSN for siding "A" in question also connects through contacts 61, 62 and 63 the station code jumpers 64, 65 and 66 relating to field station No. 1 at the west end of this particular siding, to station code buses such as 23, 24 and 25, which in turn are connected through front contacts 57, 58 and 59 of relay W–LC relating to the west end of siding "A" then selected to the station code step terminals 29, 30 and 31 of the code communication system. The connections on the left side of the station code jumpers 64, 65 and 66 determine whether bus 32 or 33 is selected and in which sequence they are selected for proper station identification. It can be clearly seen that these buses in turn lead to the SL (short long) and LS (long short) relays which form the code for transmission over the communication line. In like manner station No. 2 is also connected so that a coded message may be sent to the east end of siding "A."

If it should happen that the system is already in use for transmission of controls, or has been conditioned for such use, the actuation of the siding selector push button A is ineffective at that time, and must be continued until, or repeated when, the system is available for transmission of new controls.

The energization of the group selection relay A–GSN for the siding "A" in question closes a contact 88 (see FIG. 9) which lights a lamp 89 to illuminate the letter "A" (or other symbol) by which this particular siding is identified.

This completes what may be termed the siding selection portion of the operation.

(2) Referring to the master control panel of FIG. 2, the operator's manipulation to take care of the eastbound train movement onto the siding "A" at its west end for the typical case assumed, comprises a single movement of a route switch, such as switch 34. This switch 34 by reason of its physical relationship to the representation of a typical siding on the master panel, and also by reason of the letter R thereon, is readily identified as the particular manual device to cause operation of the track switch at the west end of the siding to a reverse position. Since an eastbound train movement is involved in the example assumed, the operator turns the route switch 34 in the same direction the train is to move, i.e. to the right. This position may also be identified, if desired, by letters EB or the like. As soon as the operator lets go of this route switch 34, it is self-restored to the normal middle position shown, in the usual way by a restoring spring, or the like.

This single movement of the route switch 34, following selection of the particular siding "A," is the only manipulation required of the operator to establish the proper switch and signal conditions for the eastbound train movement onto the siding "A" in the example assumed.

Considering now the circuit energizations and relay operations resulting from such single movement of the route switch 34 under consideration, and referring to FIG. 5, the apparatus in the control office comprises for each siding end of the CTC territory a group of relays including a signal direction control mag-stick relay D, and a switch control mag-stick relay W. These mag-stick relays, which are constructed in the manner disclosed for example in the prior patent to Willing et al. Patent No. 2,535,977, have the operating characteristic that the relay armature and contact fingers, when operated to one position or the other by energization of a corresponding operating winding, are magnetically held or stuck in that position, until subsequently changed by the energization of the other winding. In the interest of simplicity it is assumed that the contact fingers of these mag-stick relays D and W are operated in the direction of current flow through their upper and lower windings.

In effect, the signal direction control mag-stick relay D and switch control mag-stick relay W are devices for storing switch and signal controls manually impressed thereon until subsequently changed, either by a different manual control, or automatically in response to occupancy and withdrawal indications of train movements over track sections, as later described.

In the particular example assumed, the manual movement of the route switch 34 to the right causes temporary energization of the signal control mag-stick relay 2–3D (see FIGS. 7A and 7B9) to provide an eastbound signal clearing code, and the switch control mag-stock relay W to provide a reverse switch control code element. The specific circuits for such energization may be traced from (+), through back contacts 40 and 41 of relays W–LC and W–CH respectively, bus 42, the control finger 43 of the route switch 34 to the right, bus 44, front contact 45 of siding selection relay A–GSN, wire 46, contact finger 47 of mag-stick relay 2–3D. If, as shown, signal direction control mag-stick relay 2–3D happens to already be in the position (right hand) to clear an eastbound signal, the circuit above mentioned is not completed; but, if this relay 2–3D is in the opposite position (left hand), the upper winding is momentarily energized before its contact finger 47 is shifted to set its armature and contact fingers in the desired proper position (right hand in this case).

The circuit for operating the switch control mag-stick relay 1W to the reverse or left-hand position may be traced from the bus 42, contact finger 48 of route switch 34, bus 49, front contact 50 of relay A–GSN, wire 51, contact finger 52 in a left hand position, upper winding of relay 1W, to (—). If the contact 52 of relay 1W had been in a right-hand position, it would, of course, have remained there.

In connection with the operation of these magnetic stick type relays D and W, it is to be understood that the energization of their windings through their own contacts cause such contacts to be actuated to an opposite position although they are only momentarily energized. Also, it should be understood that the use of these relays in this manner is merely illustrative of the functions involved, and that other forms of relays for storing such control conditions could be employed.

The route switch 34 in question being the one relating to the west end of the siding, its movement closes, through its lower contact 54, an energizing circuit for the west code start or change relay W–CH from (+), wire 55, lower winding of relay W–CH, to (—). As soon as relay W–CH picks up, an obvious stick circuit is closed through its front contact 41 and including back contact 40 of relay W–LC.

It should be noted that contact 54 of the switch 34 closes the circuit for relay W–CH simultaneously with the closure of the circuits for the relays 2–3D and 1W by contacts 43 and 48 respectively; but the magnetic stick type relays are much faster in operation than the pick-up time of the neutral type relay W–CH so that they assume their positions before back contact 41 is open. In the event that other storage devices are employed or for some reason more time is required before back contact 41 is open, it would be possible to make the relay W–CH slower in picking up or provide a repeater relay in the wire 55 to slightly delay the picking up of this relay W–CH. These principles also apply to the control of the relay E–CH shown in FIG. 6B.

This completes what may be termed the control determination and manual start of the code communication system to provide the transmission of the controls to the proper field station to take care of the train movement assumed.

(3) The energization of the relay W–CH (see FIG. 6B) causes in turn energization of the associated location code determining relay W–LC and location code stick relay LCS, thereby initiating the control cycle of the communication system in the same manner explained more in detail in the Hailes et al. patent above mentioned. This assumes, of course, that the communication system had been at rest and the relay LCS had been dropped away having its back contact 56 closed.

During this control cycle, the west-location code determining relay W–LC is the only one then energized. The closure of its contacts, such as front contacts 57, 58 and 59 connects the station code buses 29, 30 and 31 to buses 23, 24 and 25 for west end field stations, which, in the case assumed, are connected through closed front contacts 61, 62 and 63 of relay A–GSN to code jumper connections 64, 65 and 66 respectively making up the particular station code for station No. 1 at the west end of the siding "A."

The contacts, such as front contacts 67, 68 and 69 (see FIG. 7B) of the west-location code determining relay W–LC connect the signal control buses 70 and 71 and switch control bus 72 to switch and signal control buses 73, 74 and 75 which in turn are connected (in the particular example assumed) to the front contact fingers 76, 77 and 78 of siding selection relay A–GSN to the control contacts 79, 80 and 81 of the signal control mag-stick relay 2–3D and the switch control mag-stick relay 1W respectively. It will be noted that the circuit for the signal direction contacts 79 and 80 also includes back contacts 82 and 83 of signals-at-stop relay 2–3GS. Normally, these back contacts 82 and 83 are closed, but when a stop control is transmitted, as later described, these back contacts are open but since the front contacts are closed the signal step connections are made to bus 32 for both steps from terminals 70 and 71.

It should be noted that the code jumpers of the selected station, such as jumpers 64, 65 and 66 of FIG. 6A as well as the signal control contacts 79 and 80 in this instance of relay 2–3D (FIG. 7B) and also the contact 81 of the relay 1W selectively connect the different station selection and control steps to the buses 32 and 33 for transmitting codes in a manner fully described in the above mentioned Hailes et al. Patent No. 2,399,734.

Thus, by referring to FIG. 3A it can be seen that in the particular example assumed, the station selection code transmitted during the control cycle in question is the particular code allocated to the field station No. 1 at the west end of the siding "A," and the control code elements are used for the reversal of the 1TW switch and the clearing of the eastbound signal 2B to conform with the respective positions in which the switch and signal control mag-stick relays 1W and 2–3D for this particular siding end were set by the actuation of the route switch 34. Note that the 2A signal is effected only when the track switch is in the normal position.

As disclosed in the Hailes et al. Patent No. 2,399,734 above mentioned (note its FIG. 7B), after the control code is sent, a relay LV (last stepping) picks up to mark the beginning of what may be termed a clearout period. Referring to FIG. 6B of this disclosure, the energizing circuit for the relay LCS, and for the master group selection relay MGSN, together with any siding relay such as A–GSN being up at the time, includes a back contact 20 of this relay LV in parallel with back contacts 21 and 22 of relays C and SB, which are energized during the initial part of the control cycle. Consequently, following the transmission of the control code under consideration to the west end of siding "A," the picking up of relay LV drops relays LCS and W–LC simultaneously when this back contact 20 opens. Also relays MGSN and relay A–GSN are dropped in a similar manner when back contact 37 opens providing there is no other source of (+) potential at the time through front contacts 84 and 85 of the E–CH and W–CH relays respectively.

In the case assumed, the operator was interested in moving an eastbound train onto siding "A," and actuated a route switch 34 for the west end only of this siding "A." It may happen, however, that the operator desires to transmit new controls to both ends of the selected siding, such as siding "A," and operates route switches for both siding ends. In that event, the code start change relay E–CH, as well as relay W–CH, is energized. At the end of the first cycle (which is transmitted to the west end field station first on account of the inherent superiority built into the circuitry associated with relays W–LC and E–LC as shown, relay W–LC, as well as the location code stick relay LCS, are deenergized; but a closed front contact 84 of relay E–CH (FIG. 6B) holds up the group selection relay for the selected siding, such as relay A–GSN, until the second control cycle is completed. During this second control cycle, relay E–CH is released as soon as relay E–LC picks up; and when relay LV (last stepping) picks up at the end of this cycle, the siding selection relay, such as A–GSN, is dropped out, along with the master group selection relay MGSN.

(4) Following the control cycle just described for the west end of siding "A," the system operates in the usual manner to operate the switch to the reverse position and clear an eastbound signal as commanded, by operation of suitable application circuits, such as disclosed, for example, in FIG. 5 of the Hailes et al. Patent No. 2,399,734 above mentioned, and in FIG. 4 of this case. Since the same apparatus is involved and similar reference characters have been applied to FIG. 4 of this case as employed in FIG. 5 of the Hailes et al. patent, it is believed to be unnecessary to point out in detail how the reception of the codes effects the energization of the switch and signal controls.

In the particular circumstances assumed, the switch code causes the energization of the switch mechanism reverse relay 1WZR and the signal control code causes the energization of the #2 (right clearance) signal mechanism relay 2RGZ. In FIG. 4 of this case, the switch control by the relays 1WZN and 1WZR extends to the switch machine 1SM through contacts of a lock relay 1L which is controlled in the usual conventional manner. In addition, correspondence relays 1NCR and 1RCR are employed and the appropriate correspondence relay is energized only when the track switch 1TW, switch machine 1SM and the relays 1WZN and 1WZR are in corresponding normal or reverse positions. In the situation under consideration, the relay 1WZR is picked up so that the relay 1RCR is energized only when the track switch 1TW is fully operated to its reverse position and locked by the switch machine 1SM. Similarly, if the relay 1WZN were just picked up, the relay 1NCR would be energized only after the track switch 1TW has been operated to its normal position and locked by the switch machine 1SM. Whenever the track switch 1TW is unlocked or is in midstroke or is out of correspondence with the control relays 1WZN and 1WZR, both of these relays 1NCR and 1RCR are deenergized.

The energization of the relay 2RGZ controlling the right clearance of #2 signal mechanism, of course, causes it to be picked-up and stuck dependent upon the passage of a train or the picking up of the stop relay 2–3B. Its energization also closes suitable control circuits for the signal 2A or the signal 2B dependent upon the position and locked condition of the track switch 1TW as indicated by the correspondence relays 1NCR and 1RCR. In the particular case being considered, the signal 2B is cleared when the correspondence relay 1RCR is picked up. When this occurs, the normally energized signal monitor relay 2M is then deenergized. Similarly, if the switch 1TW were operated to its normal position and the relay 1NCR energized, then the signal 2A would clear when relay 2RGZ is picked up. This would likewise deenergize the normally energized relay 2M.

Similarly, the relay 3M is normally energized when both the signals 3A and 3B are at stop, but, when either is controlled to indicate clear, this relay 3M is deenergized.

The relays 1T, 2M, 3M, 1NCR, and 1RCR are effective to transmit indications to the central office over the code communication system characteristic of their particular positions. Since these relays are normally energized relays, it is assumed that normal indications are transmitted indicative of their energized or picked-up positions, and when they are deenergized the opposite indication is transmitted for the particular step in question. In FIG. 4 the track switch 1TW is shown in a normal position so that relay 1NCR is normally energized and the relay 1RCR is normally deenergized. After the reception of the control cycle just described, this switch is reversed so that the relay 1RCR is energized and the relay 1NCR is deenergized.

Also, when one of these relays changes its position, a suitable cycle of operation is initiated for the transmission of the indications from that particular field station to the control office, all as described in detail in the above mentioned Hailes et al. patent. Thus, the relays shown in the control office for the control of the indications are shown in the positions corresponding to the normal positions of their controlling field station relays.

A typical arrangement for the display of indications on the track diagram for the system of this invention is illustrated in FIG. 9. It is assumed that the indications will be registered by mag-stick relays, such as 1TK for occupancy indications, 1WNK and 1WRK for switch position indications, and 3LGK and 2RGK for signal clearing indications, in the well known manner, such as shown in the Hailes et al. Patent No. 2,399,734 above mentioned. The occupancy indication is displayed by lighting a lamp 1TL in the track diagram 5 in the usual manner. The indication of a reverse position of the switch operates contact fingers of the switch indication mag-stick relays 1WNK and 1WRK from the positions shown, to the dotted positions. Similarly, the mag-stick relay 2RGK has its contact fingers operated to the dotted positions upon the reception of the indication of the clearing of either the signal 2A or 2B governing right-hand or eastbound traffic.

In the master panel type of system illustrated, the switch position and signal clearing indications are displayed on the track diagram, rather than by an out-of-correspondence lamp in a switch lever, or the lighting of a lamp in the signal lever. In the particular typical example under consideration, the operation of the switch and signal indication mag-stick relays as just described results in the display of the clear signal indication by lighting a lamp 2GL in the symbol for signal 2 over a circuit from (+) through contact 90 of relay 2RGK in a left-hand position, lamp 2GL, to (—). The lighting of a reverse insert in the track diagram indicating a reversed switch is effected over a circuit from (+), through contact 91 of relay 2RGK in a left-hand position, contact 92 of relay 1WRK in a left-hand position in series with contact 93 of relay 1WNK in a left-hand position, lamp 1RL, to (—).

*Special auxiliary indicators.*—When new controls are transmitted to a given field location, such as in the typical example just considered, the power operation of track switches consumes time, and there may be a substantial delay in the reception of indications manifesting the results of the new controls transmitted. In the preferred arrangement illustrated, the track diagram is normally dark, so to speak; and if there should be faulty operation of the field apparatus for any reason, so that no signal-clear indications are received after new controls are sent, the operator heretofore was required to rely on his memory to identify the faulty field location.

For this reason it is now considered desirable to provide a special auxiliary indication identifying on the track diagram 5 each siding end, or equivalent control area, to which new controls are transmitted, and maintain such indication of "unfinished business" until a clear signal indication is received, and the regular indicators of switch position and signal clearing are lighted. Accordingly, a special indicating lamp is provided, preferably one for each siding end. For example, lamps AW–UL and AE–UL are associated with the western and eastern ends of siding "A" respectively. Similar lamps BW–UL and BE–UL are associated with siding "B" (see FIG. 1). The typical control for these lamps is shown in FIG. 9 for siding "A". More specifically, contact 94 of a cycle mag-stick relay 2–3CYK controls the connection of lamp AW–UL to the flashing bus 95 which is intermittently energized by a cam operated interrupter contact 96, or equivalent.

A continuing and prolonged flashing of the lamp (such as AW–UL) at a given siding end, longer than the time normally required for operation of a track switch and clearing of a signal, together with transmission of indications, will attract the attention of the operator and indicate to him a place where an unusual or abnormal operation has occurred that calls for his attention. In some instances, the situation may be remedied by repeating the control code to rectify previous faulty manipulation, temporary code mutilation, or the like, thereby avoiding train delay. In other words, a special auxiliary indicating lamp serves to afford the operator useful information about the response of the field apparatus to his manipulation.

In this particular arrangement of the circuits illustrated, the lower winding of the cycle relay 2–3CYK is energized to cause flashing of the lamp AW–UL by a circuit from (+), front contact 100 of the location code determining relay W–LC for the west end of the siding, bus 101, front contact 102 of siding selection relay A–GSN for the particular siding in question, back contact 103 of signal-to-stop control relay 2–3GS for this siding end, lower winding of relay 2–3CYK, to (—). Thus, cycle mag-stick relay 2–3CYK is operated to the left to flash lamp AW–UL whenever a control code (except one including a signal-to-stop control), is transmitted to the particular siding end in question. If, and when, a signal-clear indication is received to operate either the clear to the left of #3 signal indication mag-stick relay 3LGK or the clear to the right of #2 signal indication mag-stick relay 2RGK energy is supplied through either contact 97 or 91 respectively, through contact 98 of relay 2–3CYK to its upper winding, to (—). This temporarily energizes it to restore its armature and contacts to the normal right-hand positions shown. Since the relay 2–3CYK is of the magnetic-stick type, energization through its own contact 98 gives it sufficient energization to actuate its contacts to the right-hand position before such energization is interrupted by the movement of contact 98. Obviously, the movement of contacts of this relay 2–3CYK to right-hand positions disconnects the associated lamp AW–UL from the flashing bus 95 at polar contact 94 when in a right-hand position.

Another special indicating arrangement of an optional nature, but diagrammatically illustrated in FIG. 9, is a switch viewing push button AW–VPB which has to do with switch position indications under the special condition when the switch is operated without clearing a signal. It is sometimes expedient to operate a remote controlled track switch back and forth to clear the switch points of snow and ice, or test, or maintenance purposes, or the like; and it may be desirable to do this when trains are near by, so that signals should not be cleared for an unwanted or premature movement of such a train. As previously mentioned, the preferred indication arrangement shown comprises a normally dark board, and there is no display of switch position indication unless an indication of a clear signal is received. This is accomplished by placing contacts 92 and 93 pertaining to the switch position in series with the signal indication contacts 91 or 97. Hence, if the operator should send out a switch position control without a signal clearing control, there is no direct indication on the track diagram of the results of this attempted control of switch position. However, the transmission of the switch control causes operation of relay 2–3CYK, for example, to cause flashing of lamp AW–UL. To take care of this situation, a special viewing push button switch AW–VPB may be provided to supply current to the contacts of the switch position mag-stick relays WNK and WRK, and thereby light the normal or reverse switch indicators, in accordance with the switch position indications received.

Although the transmission of a switch control to the field station fails to give an indication of the switch position on the track diagram of FIG. 9, such code transmission is accomplished by the actuation of relays A–GSN and W-LC so that the relay 2-3CYK is actuated the same as when a signal control is also transmitted, to thus cause the lamp AW-UL to be flashed. But this flashing indication would continue indefinitely because in this instance there is no signal clearing indication received either by relay 2RGK or relay 3LGK. Thus, when the operator has ceased operation of the track switch to free it from snow or ice or the like, or any time that he actuates the push button AW-VPB to obtain an indication of the last switch position, a circuit is closed through back contact of push button AW-VPB, polar contact 98 of relay 2-3CYK in a left-hand position, upper winding of relay 2-3CYK, to (—). The energy which flows in this circuit actuates the contacts of relay 2-3CYK to the right-hand position deenergizing the flashing lamp AW-UL.

Although FIG. 9 shows only one such push button AW-VPB for the left or west end of the siding A, it is to be understood that a similar push button may be associated with each siding end of all the various sidings included in the territory under the control of this system.

The operation thus described is typical of the way in which the system of this invention affords the desired supervisory manual control over the switch and associated signals for the individual ends of the sidings, as may be required to take care of various train movements. The single manual movement of a particular route switch on the control panel in the appropriate direction performs all of the necessary functions and attains the same ultimate result as the separate manipulation of a switch lever, a signal lever, and a code start button in the conventional CTC system.

The supervisory manual control for the individual siding ends will take care of all kinds of train movements encountered in practice, including meets or passes, straight-through movements on the main track, or like train movements involving both ends of the passing siding, as well as switching movements or the like relating primarily to one siding end only.

*Automatic control for a meet between two trains.*—As previously explained, a "meet" between two opposing trains at a given siding is a common train movement in a conventional CTC installation for a single track railroad. FIGS. 10A through 10D illustrate the positions of the switches and signal displays at the siding ends during the different stages of a typical "meet" between two trains, for the particular case where the eastbound train takes the siding.

It can be seen that there is an initial setting of switch position and the signals cleared preparatory to the arrival of trains, as indicated in FIG. 10A, and that this initial condition must be changed by subsequent control at the proper time with respect to both siding ends as the respective trains pass the siding ends, as indicated in FIGS. 10B and 10C, in order that the trains may complete the meet and continue on their way, as indicated in FIG. 10D.

In the CTC systems at present available, the operator may readily set up the initial condition preparatory to the two trains to make a meet, as indicated in FIG. 10A; but this is only the beginning of his work. He must be alert to changes in the indications of occupancy of each of the detector track circuits at the siding ends, and promptly take the appropriate action as the respective trains pass over these track circuits. If the operator does not act as promptly as the movement of the trains will permit, there is bound to be some unnecessary train delay in completing the desired meet.

In the system of this invention, a single manual movement of the "meet" switch on the "automatic control" section of the master panel is all that is required, once the desired siding has been selected by actuation of a siding selector push button, such as push buttons A, B, etc. of FIG. 2. This provides the initial setting of the switches and signals at both siding ends for the desired meet, preparatory to the arrival of the two opposing trains, and also conditions means to change the switch positions and clearing of the signals as required to complete the meet automatically in response to the occupancy of the detector track sections by the trains themselves.

*Initial manual control.*—As a typical example of such automatic control for a meet, assume the operator desires to have two trains meet each other at a given siding, such as at the siding "A", where the eastbound train is to take the siding, as indicated in FIG. 10B. When the operator actuates the selector push button A for the particular siding at which the meet is to occur, the siding selection circuits of FIGS. 6A and 6B operate in the same manner as previously explained to cause energization of the siding selection relay A-GSN.

Referring to FIGS. 6A and 6B, by the picking-up of the siding selection relay A-GSN, it can be seen that certain contacts of the meet and pass switches are connected to buses which will cause energization of the change relays W-CH and E-CH dependent upon the meet relay AW-M and the pass relay AW-P. However, these connections can best be seen by referring to FIG. 8 where a more complete circuit arrangement is shown including the meet and pass relays for at least two sidings. In the circumstances being considered, it is assumed that the eastbound train E (see FIG. 10A) is to take the siding. For this reason the meet switch is operated to the right. This energizes the west meet relay AW-M and the east meet relay AE-M respectively for the opposite ends of the siding "A." By referring to FIG. 7 it can be seen that this circuit for the relay AW-M is closed from (+) through a circuit including back contact 110 of relay E-LC, back contact 111 of relay W-LC, contact 112 of meet switch in the eastbound position EB, bus 113, front contact 114 of relay A-GSN, bus 115, winding of meet relay AW-M, to (—). As soon as this relay AW-M picks up, a stick circuit is closed for it from (+), through a circuit including back contacts 116 and 118 in parallel on relays CNP (cancellation repeater) and A-GSN respectively, back contact 117 of relay 1TKP (track indication repeater), front contact 119 of relay AW-M, upper winding of relay AW-M, to (—).

Also, as soon as the meet relay AW-M picks up, energy is supplied from the bus 115 through the front contact 120 of relay AW-M to bus 55 for change relay W-CH causing it to immediately pick up. A stick circuit path is formed by this action from (+) potential through back contact 40 of the W-LC relay, front contact 41 of the W-CH relay, through the coil to (—) potential.

At the same time that the meet relay AW-M is picked up, a similar circuit (see FIG. 8) is closed for the meet relay AE-M for the east end of the siding. This circuit is closed through front contact 121 of relay A-GSN, bus 122, upper winding of relay AE-M, to (—). This closes front contact 123 of relay AE-M and causes it to apply energy to the change relay E-CH at the same time that energy is applied to the relay W-CH. Also, it should be noted that the closure of contact 124 of relay AE-M completes a stick circuit for this relay from (+) through a circuit including back contacts 116 and 118 in parallel of relays CNP and A-GSN respectively, back contact 125 of relay 2TKP, front contact 124 of relay AE-M, lower winding of relay AE-M, to (—).

From this it can be seen that the relays W-CH and E-CH will be energized simultaneously and will pick up their contacts simultaneously, but since the control of relays W-LC and E-LC is interlocked, the relay W-LC (see FIG. 6B) will pick up first by a circuit including back contact 56 of relay LCS, and front contact 127 of relay W-CH. The picking-up of relay W-LC opens the stick circuit for relay W-CH at back contact 40; but the relay E-CH will remain stuck-up through a circuit closed from (+) and including back contact 129 of relay E-LC, front contact 130 of relay E-CH, upper winding of relay E-CH, to (—). The picking-up of relay W-LC also closes its own stick circuit from (+) potential through contacts 20, 21 and 22 in parallel, through coil LCS to front contact 136 of W–LC, through the coil to (—) potential, which also picks up the LCS relay to open back contact 56, thereby opening the W–LC selection circuit.

In the typical example assumed, the movement of the meet switch to the right (east bound train to take the siding) causes energization of circuits for positioning the switch control relays 1W and 2W associated with opposite ends of the siding and also the signal direction relays 2–3D and 4–5D. This all happens momentarily while the meet switch is held in an operated position (it is self-restoring to its mid-position) and before the relay W–LC is picked up.

For example, referring to FIGS. 7A and 7B a circuit is closed from (+), and including back contact 110 of relay E–LC, back contact 111 of relay W–LC, contact 131 of meet switch in position EB, bus 49, front contact 50 of relay A–GSN, bus 51, contact 52 of relay 1W in a left hand position, upper winding of relay 1W to (—). The current flowing in this circuit causes the contacts of this magnetic stick type relay 1W to be actuated to their right hand position for establishing the proper conditions for the transmission of a reverse control for the switch machine 1SM at the west end of siding A as will be presently described.

At the same time, a circuit is closed for the directional relay 2–3D from (+) and including back contact 110 of relay E–LC, back contact 111 of relay W–LC, contact 132 of meet switch in the position EB, bus 44, front contact 45 of relay A–GSN, bus 46, to contact 47 of relay 2–3D which is shown in its right hand position. If contact 47 were in the left hand position, then energy would be fed through the upper winding of relay 2–3D, to (—). This would cause the contacts of this magnetic stick type relay to be actuated to their right hand position for storing a control for the energization of the signal control relay 2RGZ (see FIG. 4) as will be described shortly.

In a similar manner the contacts 133 and 134 of the meet switch will cause the actuation of the relays 2W and 4–5D for the east end of siding A as graphically illustrated in the block diagram of FIG. 5.

As above explained in connection with the manual control, the picking-up of the relay W–LC, closes front contacts 57, 58 and 59 (see FIG. 6B) for the transmission of the station selection code on the station code steps while the closure of front contacts 67, 68 and 69 (see FIG. 7B) close the circuits for the transmission of the signal and switch controls on the signal and switch control steps of the code system as determined by the positions of contacts 79 and 80 of the direction relay 2–3D and by contact 81 of the relay 1W respectively. This operation of the code system to transmit switch and signal controls results in the picking-up of the relay 1WZR (see FIG. 4) and the relay 2RGZ in the proper sequence and such relays remain picked up. The actuation of the relay 1WZR causes the track switch 1TW to be operated to its reverse position after which the relay 2RGZ causes the signal 2B to indicate "caution" for the train E of FIG. 10A to enter the siding as shown in FIG. 10B.

As soon as the code communication system has completed its transmission to the west end of siding "A," the relay W–LC is released in a manner fully described in the above mentioned prior Patent No. 2,399,734. A simple representation of this is shown in FIG. 6B where the LV (last stepping) relay will be the last one to become energized and at a time when the C and SB relays are still energized. It can be seen that this condition will remove (+) potential from the LCS and either the W–LC or E–LC relays whichever of the latter is energized. Specifically, at this time since both W–LC and LCS relays are deenergized this permits the relay E–LC to be picked-up since the relay E–CH has been stuck up through back contact 129 (see FIG. 6B). This energization of the relay E–LC is effected in the usual way by a circuit including front contact 135 of relay E–CH, back contact 127 of W–CH relay, and back contact 56 of the LCS relay. This causes the LCS relay to be picked-up a second time by energizing it through front contact 137 of the E–LC relay, resulting in sticking the latter. The opening of back contact 129 also causes the E–CH relay to lose its stick voltage, consequently it releases. This also causes the transmission of the station selection code for the selection of that station at the east end of siding "A" followed by the switch and signal controls as selected by the relays 2W and 4–5D to energize relays 2WZN and 5LGZ. This effects the control of switch 2TW to its normal position and the clearing of signal 5A to display "caution" or yellow since the signal 3A will be at stop while the train E is entering the siding. When the train E has fully entered the siding as shown in FIG. 10B, further operations will occur for automatically operating the switch 1TW to its normal position and allowing the signal 3A to indicate "proceed" or green. In the meantime with the train E on the siding the train W can, of course, proceed past the signal 5A at a caution speed and approach the signal 3A prepared to stop until such signal has been cleared as above mentioned.

Thus, the actuation of the meet switch conditions the track switch and signal control magnetic stick type relays for both ends of the siding so that the preliminary train movements may take place for the desired meet.

It should also be noted by referring to FIG. 6B that the transmission of two successive codes over the code type communication system results in opening back contacts 37, 38 and 39 of relays LV, C, and SB respectively at the end of each of the successive cycles, but this does not release the siding group selection relay A–GSN, because front contact 84 of relay E–CH is maintained closed between the first and second cycles of operation. This maintains back contact 13 of relay MGSN open, so that no other siding selecting relay may be energized by the accidental actuation of a siding selector push button. The relay E–CH is released at the beginning of the second cycle so that at the end of the second cycle the relay A–GSN is released, for at this time all (+) potential sources will be disconnected from the MGSN relay causing it to drop out and thereby removing the (+) energy for the stick voltage to the front contact 18 of the A–GSN relay. As before, since the LV relay is the last to pick-up within the C, SB, and LV group it will be effective in dropping out the E–LC and LCS relays.

It also might be noted that the energization of the meet relays AW–M and AE–M at the respective ends of siding A in question is a conditioning operation, since these relays do not effect any distinctive controls under the circumstances above described; but they are rather conditioned in preparation for significant operations subsequently initiated by movement of the trains themselves. Likewise it can be said that the deenergization of these relays is also accomplished by any train movement into and out of the respective east or west ends of the siding.

*Automatic completion of a meet.*—When the train E passes into the first detector track section 1TS associated with the track switch 1TW in FIG. 4, the track relay 1T is released opening front contact 328 before the back contact 327 of its repeater relay 1TP is closed. This means that the signal controlling relay 2RGZ is released placing the signals 2A and 2B at "stop," or red indication.

In addition, the releasing of the track relay 1T causes an indication to be transmitted to the central office in a manner described in detail in the above invention of Hailes et al. Patent No. 2,399,734, which results in the actuation of the contacts of the magnetic stick relay 1TK to the left hand position. Referring to FIG. 7B, it will be seen that contact 140 in a left hand position of relay 1TK shunts back contact 117 of relay 1TKP. Also, the actuation of contact 141 to the left hand position then energizes 1TKP through a rather obvious circuit including front contact 142 of relay AW–M. This opens back contact 117 of relay 1TKP, but no actuation follows. At the same time, contact 150 being in a left-hand position will apply positive potential to either the 1WN or the 1WR relays and the 3–2LD and the 2–3RD relays whichever have been selected by the positioning of the 1W and the 2–3D relays respectively. In the specific example assumed the 1W relay at this time will be in a reversed condition, therefore the 1WR relay at this time will become energized and similarly the 2–3D relay will be cleared to the right, therefore, the 2–3RD relay will become energized.

However, when the train E fully enters the siding and removes itself from track section 1TS as shown in FIG. 10B, the track relay 1T picks up causing an indication of such condition to be transmitted to the central office resulting in the polar contacts of relay 1TK to be actuated to right hand position (see FIGS. 6A and 6B). The movement of polar contact 141 from its left hand position deenergizes the relay 1TKP, but while it is deenergizing slowly, a circuit is closed for the A1–CH (A siding #1 station-change) relay from (+) and including polar contact 141 in a right hand position, front contact 143 of relay 1TKP, wire 144, winding of relay A1–CH, to (—). As soon as the relay A1–CH picks up, a stick circuit is closed including its front contact 145 and back contact 146 of relay A-GSN, so that this relay A1–CH remains picked up even though front contact 143 is closed only momentarily following the actuation of contact 141 to its right hand position.

The picking up of the relay A1–CH closes a pick up circuit for the siding group selection relay A-GSN over a circuit closed from (+) and including front contact 19 of siding selector push button A, front contact 147 of relay A1–CH upper winding of relay 1-GSN, bus 12, back contact 13 of relay MGSN, back contact 14 of relay W–CH, back contact 15 of relay W–LC, back contact 16 of relay E–CH, back contact 17 of relay E–LC, to (—). As soon as the relay A-GSN picks up its back contact 146 opens and removes the stick voltage from the A1–CH relay and also it is stuck up by a circuit including back contact 37, 38 and 39 in parallel in a similar manner to that previously described. The A1–CH relay does not release at the moment when its stick voltage is removed for it is maintained energized by the slow drop out of the 1TKP relay. When the front contact 143 of the 1TKP relay finally opens, then the A1–CH will become deenergized. This not only holds the relay A-GSN energized but also picks up the master group selection relay MGSN opening back contact 13 and thereby prevents any other siding selection relay from being energized either by the actuation of a push button or by the random occurrence of a train movement indication relating to some other siding location.

Also, while train E is in this position on the siding clear of track section 1TS a circuit is formed from positive potential through contact 141 of the 1TK relay, through front contact 148 of the 1TKP relay which is a slow release type, front contact 149 of the 1WR relay, to contact 151 now in a right-hand position to the lower coil of the 1W relay. The action of this circuit will result in positioning this 1W relay to the normal position. In a similar manner, a circuit is formed through the first two aforementioned contacts through front contact 152 of the AW–M relay, through front contact 153 of the 2–3RD relay, to contact 154 of the 2–3D relay, to the lower coil of the 2–3D relay which will result in actuating it to a left clearance position.

When the 1TK relay is established to its right-hand or normal position after train E leaves track section 1TS, contact 140 will be moved to a right-hand position while back contact 117 of the 1TKP relay will be open. This action will remove the stick voltage from the AW–M relay through its own front contact 119, thereby releasing it.

Under the present conditions when the A-GSN relay has been picked up in conjunction with the A1–CH relay, a circuit path will be formed from positive potential through front contact 138 of the A-GSN relay, through front contact 139 of the A1–CH relay to bus 55 leading to the W–CH coil, through the coil to negative potential. This will initiate the transmission of a new code to the west end of siding A in the field. This relay has stick voltage applied to it as heretofore explained. The W–LC relay now becomes energized and the LCS relay picks up immediately thereafter. Both of these actions have been explained in the preceding pages.

Under these conditions when the code is transmitted to the field it causes the pick up of the 3LGZ relay so that the 3A signal can be cleared to the left preparatory to the approach of the W train toward this signal as indicated in FIG. 10C. Such a code transmission to the field results because the 2–3D relay had previously been set to clear in a left direction. Similarly, the 1WZN relay of FIG. 4 is energized due to the fact that the 1W relay had previously been returned to its normal position. This action will prepare the route for the W train through the western end of the siding.

Upon completion of the code transmission to the field the W–LC relay and the LCS relays will be released as previously explained. Also, at the same time because of the final removal of positive potential when the LV relay becomes energized and back contact 37 opens, the MGSN relay and the A-GSN relay will be released.

When the W train enters the No. 2 section on the eastern end of the siding, the 2TK relay will be actuated to its left-hand position and the resulting action in the circuits associated with this relay will be similar to that as associated with the 1TK relay. Without going into detail at this point, this train will cause the pick-up of the 2WN relay and the 5–5LD relay. Also at this time the 5LGZ relay will be deenergized placing the 5A signal to stop. After this train progresses beyond the No. 2 section the 2W relay will be operated to the reverse position and the 4–5D relay will be operated to its right clearance direction. Completion of these circuits to cause the above two operations is established, since at this time the 2TKP relay is energized in a similar manner to the 1TKP relay as previously explained. This action prepares the route for train E to leave the siding and is clearly shown in FIG. 10C. At the same time, the A2–CH relay becomes energized in a similar manner in which the energization of the A1–CH relay became energized. The energization of this relay causes a transmission of code to the eastern end of the siding or station 2 which is effective to establishe the clearance of signals to the right for the east bound train and the operation of the 2TW switch to the reverse position. Also when the W train leaves track section No. 2 the pick up of the track relay 2T and consequently the operation of the 2TK relay to a right-hand position is effective to drop out the AE–M relay.

The progress of the trains through the track sections operates the circuits in a similar manner as before except now that the AW–M and AE–M relays are deenergized, the 1TKP and the 2TKP relays will not become energized when the trains lie on the respective track section for these relays. From FIG. 7B it can be seen that if these relays are not energized neither the 1W, 2W or 2–3D, 4–5D relays nor the A1–CH, A2–CH relays will become energized. Specifically, it can be seen that, after the AW–M and AW–P relays have been released both front contacts 142 and 155 will be open, consequently the 1TKP relay cannot become energized. This means that henceforth neither the switches nor the signals are reversed, nor are additional codes transmitted to the field, but rather the trains merely progress through the far ends of the siding according to the route as established and simply place all signals to stop after they have progressed onto track sections 1TS and 2TS. This final condition is shown in FIG. 10D where it will be noted that the left-hand end of the siding switch 1TW remains in the normal position and the right-hand end of the siding switch remains in the reverse position. Any additional train movements over this siding will require the control operator to reestablish new conditions, consequently no attempt is made to reset all switches in a normal position after any particular train movement over them.

*Automatic control of a pass between two trains.*—Another rather common train movement, which can be automatically completed by the movement of the trains themselves in a manner similar to a "meet" just described, is one in which a slow moving train (usually a freight) is side-tracked at a siding, to permit a faster following train (usually a passenger) to overtake and "pass" the first train. FIG. 11 illustrates this kind of a move for two eastbound trains conveniently termed a "pass," one following the other.

In the case of such a "pass" between two trains proceeding in the same direction, it can be conveniently assumed that the first or leading train may always be the one to take the siding, since the basic reason for the overtake or "pass" is to allow a slow moving inferior train, which normally would take the siding, to be overtaken or "passed" by a faster superior train. Hence, in the case of a "pass" there is no need for a manual selection of which train takes the siding, as in the case of a "meet." In the case of a "pass," however, two trains following one another may be approaching the siding from either direction, and the initial switch and signal settings are different on account of the direction of train movement. Accordingly, the "pass" switch on the master panel is operated in a direction to conform with the direction of movement of the two trains. This determines which end of the siding should have its switch operated to the reverse position to cause the first or leading train to take the siding.

Another difference between a "pass" train movement and a "meet" previously described, as will be apparent from the showing of FIG. 11, is that the signals for the ends of the siding are cleared for the same direction as the respective trains pass, while the switch position is always changed for each siding end by the movement of the first train over that particular switch.

Except for these distinctions, due to the inherent differences in the nature of the train moves themselves, the operation of the system of this invention for a "pass" is substantially the same as that for a "meet," previously described in detail. In brief, the movement of the "pass" switch provides the appropriate setting of the switch and signal control mag-stick relays for the two siding ends, picks up pass relays such as AW–P and AE–P of FIG. 5 for each of the siding ends and establishes through their front contacts (e.g. 128 of AW–P) of FIG. 7, circuits for energizing the code start change relays W–CH and E–CH for the siding ends. With a pass relay, such as AW–P energized, and its front contact 155 closed, relay 1TKP is energized by operation of relay 1TK to the left position as caused by train occupancy. When the train passes out of the detector track section and occupancy indicating relay 1TK is reenergized, a circuit for shifting the position of the contact fingers of the switch control mag-stick relay 1W is established the same as in the case of a meet; but since the meet relay AW–M is not energized at this time and its front contact 152 is open, there is no change in the existing position of the contact fingers of the signal control mag-stick relay 2–3D. Automatic selection of the particular siding, such as the siding A, is accomplished by energization of relay A1–CH in the siding selecting circuits of FIG. 6 in the same manner as previously explained, together with an automatic initiation of a control code cycle to the particular siding end involved.

It can be readily understood, it is believed, without further explanation, how the movement of trains as shown in FIG. 11 for an overtake or pass, into and out of the detector track sections at the ends of the siding causes automatic operation of the system to complete the intended train movement, without any additional manipulation by the operator, once the siding for the "pass" has been designated.

*Cancellation control.*—If the occasion should arise for the cancellation of a "meet" or "pass" that has formerly been established, this can readily be accomplished by the actuation of the siding selector push button, whichever siding is involved, and the actuation of the cancel push button on the automatic control panel. By referring to FIG. 8 it can be seen that the depression of this cancellation push button CNPB will energize the CNP (cancellation repeater) relay thereby removing the only other source of (+) potential from the stick voltage bus for any particular siding group of meet and/or pass relays. In particular, if the A–GSN relay is picked-up and back contact 118 is open, the only source of stick voltage for the AW–M and AE–M relays is through back contact 116. If this is now opened as in a cancellation sequence for siding A, then the meet relay AW–M and AE–M will be released and new information can be established for this siding. This action is equivalent then to the passage of a train over each siding end which heretofore released the meet or pass relays. It is well to remember that the operator is kept posted of train movements on the miniature track diagram 5 so that he will know which train movements require cancellation and can act accordingly.

MODIFICATION

In the embodiment of the invention previously considered, the apparatus for automatic completion of a meet (or pass), in response to occupancy indications, is all located in the control office, and no addition or modification of the conventional field apparatus is required. FIGS. 13–15 illustrate a modified embodiment of the invention, in which the automatic completion of meets and passes is performed by apparatus in the field. This apparatus is conditioned by additional special control codes from the control office for such automatic operation, and is operated directly by local detector track relays and repeater relays.

In this modified arrangement, since control codes are transmitted to field stations only under manual supervision, and not in response to occupancy indications, it is not necessary to provide relays such as W and D for storing the switch and signal controls last transmitted. Other relays such as WN, WR, LD, RD, A1–CH and A2–CH and their associated circuitry can also be eliminated from the control office, however, other relays to perform similar functions will be required in the field. This point will be discussed at greater length under the topic of Modified Field Apparatus. Within the control office apparatus stay-where-put switch levers for the track switches and signals at the individual siding ends, and similar "meet" and "pass" switches for automatic control, together with code start push buttons, may be employed to provide the desired switch and signal controls. Also, the organization circuits for operating the siding group selection relays, such as a A–GSN, B–GSN, etc. in response to the actuation of push buttons A, B, etc. may be modified as shown in FIG. 13.

Referring to FIG. 13, in this circuit arrangement, the siding relay last used, such as B–GSN, is maintained energized until a push button (such as A or C) for a different siding is actuated. The stick circuit for relay B–GSN may be traced from (+), through back contact 220 of relay A–GSN, wire 221, front contact 222 of relay B–GSN, wire 223, through the coil, wire 224, back contact 225 of relay C–GSN, and any other relays that may be involved, to (—). Assuming the code communication system is inactive, so that the back contacts 250, 251, 252 and 253 of relays E–LC, E–CH, W–LC, and W–CH respectively, are all closed, energy is supplied from (+) to the pick-up bus 254. Assuming that push button A is actuated, this energizes upper winding of relay A–GSN, opening its back contact 220 to break the stick circuit for relay B–GSN, and establish a stick circuit for relay A–GSN through its front contact 220 and back contacts 226 and 225 of B–GSN and C–GSN respectively to back contacts of any other relays, to (—).

A similar operation would have occurred to pick up relay C–GSN and drop relay B–GSN if push button C had been depressed; and after either relay A–GSN or C–GSN has been energized, as the case may be, subsequent actuation of another push button will release such energized relay and pick up the relay associated with this other push button.

Referring to the control office apparatus in FIG. 14, the control devices for the manual section of the master panel are of the conventional type comprising two 3-position stay-where-put lever type rotary switches, two 2-position stay-where-put lever type rotary switches and two start push buttons W–SPB and E–SPB one for each siding end, preferably arranged as indicated in FIG. 14A directly below the ends of the siding represented on the master panel. The contacts of these switches connect to the short-long (32) and long-short (33) control buses which in turn connect to the short-long and long-short relays as indicated by SL or LS marked on the contact. The common terminals are directly connected through back contacts 230 through 235 and 236 through 241 in series on the meet and pass relays M and P respectively to groups of signal and track switch control buses relating respectively to the west and east end of the siding. These groups of control buses in turn are connected in parallel to the track switch (72) and signal (70 and 71) control terminals of the control office communication apparatus 9 through groups of front contacts 242, 243, 244 and 245, 246, 247 of relays W–LC and E–LC respectively.

The "meet" switch is a stay-where-put 2-position lever rotary switch with contact fingers relating to track switch and signal controls for both the west and east end of the siding. The common terminals are connected through front contacts 230, 231, 232, 233, 234 and 235 of the meet relay M through interlocking back contacts 236, 237, 238, 239, 240 and 241 of the pass relay P, to the groups of the track switch and signal control buses for the two siding ends.

The "pass" switch is a similar stay-where-put 2-position device having its contacts connected through front contacts 236, 237, 238, 239, 240 and 241 of the pass relay P to the groups of track switch and signal control buses.

As shown in FIG. 14A, there is a meet start button MSPB associated with the meet switch, and a similar pass start push button PSPB with the pass switch. The meet start push button MSPB, for example, closes an energizing circuit through the upper winding of the meet relay M for bus with the back contacts 250, 251, 252, and 253 in series with relays E–LC, E–CH, W–LC, W–CH, respectively, wire 254, push button MSPB, wire 255, upper winding of relay M to (—) potential. Also, while this button is operated current is supplied through front contacts 256 and 257 of the relay M to two wires 258 and 259 connecting with the coils for the code start change relays W–CH and E–CH. The meet relay M is stuck up by the circuit from (—), through cancellation push button CN, cancel bus 260, winding of relay M, its front contact 261, back contact 262 of relay P, wire 263, and back contacts 264 and 265 in parallel of relays E–LC and LV respectively, the latter being within the communication apparatus 9.

The pass relay P is energized by actuation of the pass start push button PSPB, and energizes code start change relays W–CH and E–CH, and is stuck up in a similar manner to that of the M relay.

A contact finger 266 on the meet relay M cooperating with front and back contacts connected to the LS and SL relays via buses 32 and 33 is connected by wire 267 to a terminal of the communication apparatus relating to an extra or additional control step for this relay. Similarly, a contact finger 269 of the pass relay P is connected by wire 268 to a terminal for an extra code step for pass control.

*Typical operation of the control office apparatus.*— Assume the operator desires to put an eastbound train on the siding A, his actuation of the siding selector push button A picks up relay A–GSN, as previously described, closing contacts such as 227 and 228 in FIG. 13 to provide the proper combination of code elements to constitute field station code calls for the west and east ends of the particular siding A. He will also be required to place the west end signal lever 248 in the eastbound (EB) position and the west end switch lever 249 to the reverse (R) position. The actuation of the former will be effective to change the lower contact 273 from an LS to an SL code, the upper contact code remaining the same. The latter switch movement to R prepares this circuit for sending an LS code when the occasion arises. Actuation of the west start push button W–SPB, and the resultant energization of relays W–CH and W–LC initiates a control cycle for the west end of siding A in question. The contacts such as 270, 271 and 272 of the relay W–LC assure that the code elements of the station selecting code call will conform to the particular field station in question, while the switch and signal controls are those corresponding to the existing position of the west end switch and signal levers, i.e. switch lever to the right for reverse, and signal lever to the right for clearing an eastbound signal.

The field apparatus at the west end of the siding A responds to such control code in the usual manner, and it can be understood, it is believed, without further explanation, how this form of the invention operates to provide supervisory manual control for either end of any selected siding, as the operator may determine.

As a typical example of the automatic operation, assume the operator desires to have a meet between two opposing trains at siding A, as indicated in FIG. 10. He first pushes the siding selector push button A as before. Then since the eastbound train is to take the siding in such a meet, he shifts the "meet" lever to the right-hand or EB position, unless it is already there, and then operates the start push button MSPB. The resultant energization of the meet relay M in the circuits above mentioned energizes the code start relays W–CH and E–CH for both ends of the siding, and connects the groups of code buses relating to these siding ends through front contacts of relay M to the contacts of the "meet" switch.

In this way, the appropriate control codes for the initial switch and signal setting for the meet in question, as indicated in FIG. 10E, is transmitted to the field stations at both ends of the siding A in question. Due to the inherent superiority in circuit connections for energization of the relays W–LC and E–LC, the control code is sent to the west siding end first, even though the change relays W–CH and E–CH are concurrently energized. Accordingly, the meet relay M is held up after the first control code is transmitted and is not released until relay LV picks up and opens back contact 265 at the end of the transmission of the second control code, while relay E–LC is energized and has its back contact 264 open. Also, during this transmission of control codes to the two ends of the siding in question, a long-short code element is transmitted on the extra step for "meet" control, since front contact 266 of relay M is closed during these control cycles.

*Modified field apparatus.*—It is assumed in the interests of simplicity that the field station code receiving relays and circuits will be similar to that disclosed in FIG. 5 of the Hailes et al. Patent No. 2,399,734, above mentioned, including the code storage relays such as 7CS, 8CS, double wound neutral normal and reverse switch control relays WN and WR and double wound neutral signal control relays LGZ and RGZ and a signal-to-stop relay B. These relays are operated in the usual and well known maner to execute switch and signal controls and establish routes over the siding ends. In the particular case assumed reverse switch mechanism control relay WZR of FIG. 15B is energized resulting in the opening of the stick circuit and dropping the normal relay WZN. Specifically, at this time back contact 361 opens dropping the WZN relay, and as soon as the contacts transfer on this relay, a stick circuit is established for holding the WZR relay energized by closing of back contact 360 and front contact 361. This changes the pole-changing contacts 275, 276, 277 and 278 of these relays WZN and WZR to control energization of the switch machine operating circuits for operation to the reverse position. Also, when this operation to the reverse position is completed a reverse correspondence relay 3RCR is energized through contacts 279 and 280 of relays WZN and WZR, respectively. For the eastbound train movement under consideration relay RGZ is energized by a stick circuit through its upper winding and front contact 281, through contact 282 of the track detector relay 3T, or a back contact 283 of the 3T front repeater relay 3TFP, and back contact 284 of relay 6-7B in the usual way. The detector track relay 3T and its repeater open this stick circuit and automatically put the signal to stop when the train enters the detector track section. Since relay 6-7B is energized by a stop signal code in a manner similar to that for the B relay as disclosed in the Hailes et al. patent above mentioned, relay RGZ (or LGZ if up) is dropped by opening of its stick circuit when back contact 284 opens. This is the result of the office control for manually putting the signal to stop. Considering now the supplemental apparatus, which is provided in the embodiment of this invention for automatically completing a meet or pass movement by the trains themselves at one siding end, comprising in general a field meet relay FM, a field pass relay FP, and switch position and signal direction control relays WNLG, WNRG, and WRLG. The WNLG relay stores the data for operating the switch to normal and the left clearance of the signal at some time after it becomes energized. Similarly the WNRG relay stores data for operating the switch to normal and the right clearance of the signal, and WRLG for operating the switch to reverse and the left clearance of the signal.

The sequence of operation for automatic completion of a meet in response to the movement of trains into and out of the detector track sections at the siding ends is initially the same as previously considered, and diagrammatically indicated in FIG. 10, except that the operations occur in the field.

As previously indicated, a long-short code element is transmitted on the extra control step provided for "meet" control, and this causes closure of the front contact 285 of the coding relay 13CS (FIG. 15A), so that upon energization of the bus 274 during the execution period current may flow through the upper winding of the field meet relay FM, through interlocking back contact 286 of field pass relay FP, wire 287, through front contact 288 or 289 whichever of relays LGZ or RGZ are energized, wire 290 front contact 291 of detector track relay 3T. The contacts 288 and 289 of signal clearing relays LGZ or RGZ check against unwanted energization of the field meet relay FM when an initial clearing of signals for a meet has not occurred; and front contact 291 of the detector track relay 3T precludes energization of relay FM inadvertently while the detector track relay is deenergized, and thereby prevents an unwanted reversal of switch position and signal clearing while this train moves out of the track section.

The field meet relay FM is maintained energized after cessation of the code transmission through front contacts 292 and 293 in parallel of signal clearing relays LGZ and RGZ, and front contact 294 and lower winding of relay FM. The storage of the switch position and switch control to be later executed automatically is provided in the particular arrangement illustrated, on other relays such as WNLG, which is the particular storage relay to be energized in the case assumed, as indicated on the west end of the siding in FIG. 10B. The energizing circuit for the lower winding of this storage relay WNLG may readily be traced from (+), front contact 295 of meet relay FM, front contact 296 of the switch mechanism reverse relay WZR, front contact 297 of the right clearance of signal mechanism relay RGZ.

Storage relay WNLG is maintained energized by a stick circuit through its front contact 298, back contact 299 of normal correspondence relay NCR, back contact 300 of signals-at-stop relay 6-7B.

When the eastbound train enters the west detector track circuit, either before or after the arrival of the other westbound train, the release of detector track relay 3T picks up though its back contact 350, a back contact repeater 3TBP. Assuming preconditioning is to be prevented, nothing happens at this time. When the eastbound train passes into the siding, however, and the detector track relay 3T again picks up, a circuit is temporarily established during the release time of the 3T back repeater relay 3TBP from (+), through its front contact 351, front contact 352 of detector track relay 3T (now energized) to a bus wire 353. At this time, storage relay WNLG is the one energized, therefore its front contacts are closed including 354. Current flows from the bus, through this front contact 354 of relay WNLG, wire 355, through back contact 356 of code storage relay 7CS, wire 357, through upper winding of switch mechanism normal control relay WZN, picking up this relay through back contacts 358 and 359 (—) potential. Now the switch mechanism reverse relay WZR will drop out because back contact 360 will open the stick voltage circuit to its lower coil. Concurrently, the appropriate switch control having been registered, (+) voltage is maintained on bus wire 353 until relay 3TBP contacts have transferred, through front contact 362 of relay WNLG, front contact 363 of relay WZN now closed, wire 364, back contact 365 of code storage relay 11CS, wire 366, through lower winding of signal clearing relay LGZ, thereby permitting the westbound signal to clear, as and when the switch relay is operated to the normal position.

Operation of the switch to the normal position and clearing a westbound signal completes the meet in question insofar as the west end of the siding is concerned; and when the normal correspondence relay NCR is energized, the opening of its back contact 299 releases the storage relay WNLG. The field meet relay FM previously had been released when the train in question first entered the detector track section and dropped relay RGZ, so that now all of the relays and circuits relating to the meet operation under consideration are restored to the normal inactive position, insofar as the west end of the siding is concerned.

Similar field meet and pass relays, storage relays such as WNLG, WNRG, etc., and analogous circuit connections are also provided as part of the field apparatus for the other or east end of the siding. In order to keep the discussion as general as possible no specific location number or code has been assigned to the relays for any particular station although siding "B" was selected as an example for this discussion of the modification. It can be readily understood that in actual practice where groups of these relays will be required for each field station that specific designations would probably be assigned to each relay at all sations such that each would carry a distinctive symbol in order to avoid confusion. There are slight differences in the electrical connections, readily appreciated by one skilled in the art, due to the difference in switch position and signal clearing required for the different ends of the sidings, as indicated in the table of FIG. 10. The apparatus for the other or east siding end is actuated by the arrival of the westbound train to change the switch position and the signal clearing as required for the meet and indicated in FIGS. 10B and 10C.

The other storage relay for a meet, such as WRLG, is energized through another front contact 370 of the field meet relay FM when the initial switch position is normal to close front contact 371 of relay WZN, and signal clearing for an eastbound train is accomplished to close front contact 372 of relay RGZ.

*Automatic control for passes.*—Substantially the same operation as described for a meet occurs when the operator desires to accomplish a pass between two trains, such as indicated for example in FIG. 11, and manipulates the "pass" switch of FIG. 14A to the EB position shown (if not already there) for the two eastbound trains following one another. Actuation of the pass start push button PSPB picks up the pass relay P, connecting the west and east groups of switch and signal control buses through front contacts 236 through 241 of relay P to the common terminals of the "pass" switch, so as to cause transmission of the appropriate control codes to the siding ends for the initial switch and signal setting for the train movement in question as indicated in FIG. 11A.

In this case of a pass, the code element on the extra step causes energization of the code storage relay 14CS of FIG. 15A and closure of its front contact 375 energizes the upper winding of the pass relay FP during the execution period. In the case of the two eastbound trains assumed, with the leading train to take the siding, the switch mechanism reverse control relay WZR and the right signal mechanism clearing relay RGZ are energized, closing their front contacts to energize storage relay WNRG. When bus wire 353 is energized upon the arrival and departure of the first eastbound train 1E, front contact 376 of storage relay WNRG causes energization of wire 355 to operate normal switch control relay WZN; and when this has operated to close its front contact 377, current may flow from the bus 353, front contact 378 of relay WNRG, and front contact 377 of relay WZN, wire 379, back contact 380 of code storage relay 12CS, to energize signal control relay RGZ. Thus, the switch is thrown from reverse to normal back of the first train 1E and the eastbound signal is again cleared to the right for the second train 2E to proceed.

Apparatus and circuits similar to that shown in FIG. 15 for the east end of the siding in question automatically cause a change in the switch position and signal clearing as indicated in FIGS. 11B and 11C, so that the train 1E may resume its movement.

In the case of a pass for two westbound trains, the switch for the west end is initially set in the normal position and the westbound signal cleared. Under these conditions the other storage relay WRLG is energized through front contact 381 of field pass relay FP, front contact 382 of relay WZN, and front contact 383 of relay LGZ. Upon movement of the train out of the west detector track section, i.e. the second train originally following the first in the case assumed, front contact 384 of storage relay WRLG causes energization of the switch mechanism control reverse relay WZR over wire 385 and back contact 386 of code storage relay 8CS. When relay WZR is operated current is supplied through front contacts 387 and 388 of relays WRLG and WZR to wire 364, and back contact 365 of code storage relay 11CS, over wire 366, to lower winding of relay LGZ, thereby restoring this relay to clear the westbound signal again for the first train to leave the siding over the switch reversed.

Having thus described an automatic centralized traffic control system and one possible modification of such a system within the present invention, it is desired to be understood that the specific forms herein related and illustrated were selected to facilitate the disclosure of the invention rather than to limit the scope or number of forms which this invention may assume, and it is further to be understood that various adaptations, alterations, and/or modifications may be applied to the specific form herein shown in order to meet the requirements of practice without in any manner departing from the spirit or scope of this present invention.

What I claim is:

1. A centralized traffic control system for a track layout having at least one siding connected at its ends by power track switches to a main stretch of single track and having ormally at stop signals for governing traffic on the siding and on the main track in both directions over each of the track switches comprising:
   (a) a code communication system including a communication channel connecting a control office and remotely spaced field stations at the ends of the siding for the communication of switch and signal control codes to the field stations and for the communication of indications to the control office,
   (b) a single manually operable device at the control office having at least one distinctive operated position for the designation of said siding for the meeting of trains,
   (c) means responsive to the actuation of said device to said distinctive operated position for transmitting over said communication channel selected switch and signal control codes for the field stations at both ends of the siding to set up opposing diverging routes through the ends of the siding respectively for the meeting of trains, and
   (d) control means including said code communication system responsive to the passage of a train entirely into the siding for establishing a route permitting passage of an opposing train on the main track beyond the passing siding.

2. A centralized traffic control system according to claim 1 wherein said control means is effective at each end of the siding after the passage of a first train through that end of the siding to set up a route for an opposing train through the track switch at that end of the siding.

3. A centralized traffic control system according to claim 1 wherein said code communication means is of the traffic master type in that said device is a master device that can be selectively connected for use in setting up routes for the meeting of trains at any one of a plurality of different sidings.

4. A centralized traffic control system according to claim 3 wherein locking means is provided to prevent the use of said master device in controlling meets at a second siding until the last designated controls by said master device for a different siding have been communicated by said code communication systems.

5. A centralized traffic control system for a track layout having at least one siding connected at its ends by power track switches at respective field stations to a main stretch of single track and having normally at stop signals for governing traffic on the siding and on the main track in both directions over each of the track switches comprising:
   (a) a communication channel,
   (b) normally at rest code communication means including said code communication channel connecting a control office and the field stations for the communication of selected control codes for the track switches and signals and for the communication of indications codes from the ends of the siding to the control office when rendered active,
   (c) a single manually operable device at the control office having at least first and second operated positions for the designation of said siding for the meeting of trains,
   (d) means responsive to the actuation of said device to said first or second operated position to selectively designate whichever one of two meeting trains is to take the siding and to transmit over said communication channel selected switch and signal codes for both field stations respectively to set up routes for either of the trains to take the siding and for the other train to proceed on the main track in accordance with whether said device is actuated to said first or said second position, and (e) control means including said code communication means responsive to the passage of a train entirely into the siding for setting up another route by the communication of track switch and signal control codes permitting passage of the opposing train on the main track beyond the passing siding.

6. A centralized traffic control system according to claim 5 wherein said device is a master device for use in setting up routes and means is provided for rendering said master device selectively operable to control the meeting of trains at any one of several sidings that may be designated.

7. A centralized traffic control system for a track layout having at least one passing siding connected by power track switches to a main stretch of single track and having normally at stop signals for governing traffic on the siding and on the main track in both directions over each of the track switches comprising:

(a) a code communication system including a communication channel connecting a control office and remotely spaced field stations at the ends of the passing siding for the communication of switch and signal control codes to the field stations and for the communication of indication codes from the field stations to the control office, (b) a single manually operable device at the control office having at least one distinctive operated position for the designation of said passing siding for the passing of trains proceeding in the same direction wherein a first train is to enter the passing siding and a second train is to pass in the same direction on the main track, (c) means responsive to the actuation of said device to said distinctive operated position for transmitting over said communication channel selected switch and signal control codes for the field stations at both ends of the passing siding to set up one route into the siding for a given direction of traffic for said first train and to set up a second route for said second train to pass on the main track through the track switch in its normal position connecting the passing siding to the main track at the leaving end of the siding, and (d) control means including said code communication system responsive to the passage of the first train into the passing siding for establishing a route permitting passage of the second train through the track switch at the entering end of the passing siding in its normal position.

8. A centralized traffic control system according to claim 7 wherein said device is a master device and means is provided for rendering it selectively operable to control the passing of trains at each of several passing sidings.

9. A centralized traffic control system for a track layout having at least one passing siding connected by power track switches to a main stretch of single track and having normally at stop signals for governing traffic on the siding and on the main track in both directions over each of the track switches comprising:

(a) a code communication system including a communication channel connecting a control office and remotely spaced field stations at the ends of the passing siding for the communication of selected switch and signal control codes to the field stations and for the communication of indication codes from the field stations to the control office, (b) a single manually operable device at the control office having at least first and second operating positions for the designation of said passing siding for the passing of trains proceeding in the same direction for either direction of traffic, (c) means responsive to the actuation of said device to said first or said second operated position to selectively designate the direction of traffic through the passing siding and for transmitting over said communication channel selected switch and signal control codes for the field stations at both ends of the passing siding track to set up one route into the siding for the designated direction of traffic for a first train proceeding in said designated direction and to set up a second route for a second train proceeding in said designated direction to pass through the track switch in its normal position connecting the passing siding to the main track at the leaving end of the siding, and (d) control means including said code communication system responsive to the passage of the first train completely into the passing siding for establishing a route permitting passage of the second train through the track switch in its normal position at which the first train entered the passing siding.

10. A centralized traffic control system according to claim 9 wherein said control means is effective in response to passage of said second train past the leaving end of the passing siding to initiate said code communication system into a cycle of operation for the communication of switch and signal control codes to the leaving end of the passing siding to establish a route for the passage of the first train out of the siding.

11. A centralized traffic control system according to claim 5 wherein said device is a master device and means is provided for rendering the master device selectively operable to control the passing of trains at each of several passing sidings.

12. A centralized traffic control system for a track layout having at least one passing siding connected by power track switches to a main stretch of track and having normally at stop signals for governing traffic on the siding and on the main track in both directions over each of the track switches comprising:

(a) a code communication system including a communication channel connecting a control office and remotely spaced field stations at the ends of the passing siding for the communication of selected switch and signal control codes to the field stations and for the communication of indication codes from the field stations to the control office, (b) a single manually operable device at the control office having at least one distinctive operated position for the designation of said passing siding for the passing of trains proceeding in the same direction wherein a first train is to enter the passing siding and a second train is to pass in the same direction on the main track, (c) another single manually operable device at the control office having at least one distinctive operated position for the designation of said siding for the meeting of trains, (d) means responsive to the actuation of either of said devices to its distinctive operated position for transmitting over said communication channel selected switch and signal control codes for the field stations at both ends of the siding to set up routes appropriate for the meeting of opposing trains or the passing of trains proceeding in the same direction as has been designated by the particular device that has been actuated, and (e) control means including said code communication system responsive to the passage of a train completely over one of the established routes for establishing another conflicting route for the passage of another train.

13. A centralized traffic control system according to claim 12 wherein said devices are master devices and means is provided for rendering them selectively operable to control the establishment of routes for trains at each of several passing sidings.

References Cited in the file of this patent

UNITED STATES PATENTS

| | | |
|---|---|---|
| 2,229,736 | Hailes | Jan. 28, 1941 |
| 2,399,734 | Hailes | May 7, 1946 |
| 2,549,151 | Young | Apr. 17, 1951 |
| 2,903,572 | Wells | Sept. 8, 1959 |
| 2,914,662 | Preston | Nov. 24, 1959 |
| 2,916,612 | Marple | Dec. 8, 1959 |